(12) United States Patent
Bhattacharyya et al.

(10) Patent No.: US 10,803,213 B2
(45) Date of Patent: Oct. 13, 2020

(54) PREDICTION, PLANNING, AND OPTIMIZATION OF TRIP TIME, TRIP COST, AND/OR POLLUTANT EMISSION FOR A VEHICLE USING MACHINE LEARNING

(71) Applicant: ioCurrents, Inc., Seattle, WA (US)

(72) Inventors: Bhaskar Bhattacharyya, Seattle, WA (US); Cosmo King, Bellevue, WA (US); Samuel Friedman, Seattle, WA (US); Kiersten Henderson, Seattle, WA (US); Alexa Rust, Seattle, WA (US)

(73) Assignee: IOCURRENTS, INC., Seattle, WA (US)

( * ) Notice: Subject to any disclaimer, the term of this patent is extended or adjusted under 35 U.S.C. 154(b) by 0 days.

(21) Appl. No.: 16/678,991

(22) Filed: Nov. 8, 2019

(65) Prior Publication Data
US 2020/0151291 A1    May 14, 2020

Related U.S. Application Data

(60) Provisional application No. 62/758,385, filed on Nov. 9, 2018.

(51) Int. Cl.
*G06F 30/20* (2020.01)
*G01C 21/20* (2006.01)
*G06N 5/04* (2006.01)
*G06N 20/00* (2019.01)
*G06F 111/10* (2020.01)

(52) U.S. Cl.
CPC ............ *G06F 30/20* (2020.01); *G01C 21/20* (2013.01); *G06N 5/04* (2013.01); *G06N 20/00* (2019.01); *G06F 2111/10* (2020.01)

(58) Field of Classification Search
CPC ..... G06F 30/20; G06F 2111/10; G06N 20/00; G06N 5/04; G01C 21/20
USPC .......................................................... 701/102
See application file for complete search history.

(56) References Cited

U.S. PATENT DOCUMENTS

| | | |
|---|---|---|
| 3,951,626 A | 4/1976 | Carey |
| 3,960,012 A | 6/1976 | Ingram |
| 3,960,060 A | 6/1976 | Eickmann |
| 3,972,224 A | 8/1976 | Ingram |
| 3,974,802 A | 8/1976 | Lundquist |

(Continued)

OTHER PUBLICATIONS

Ahmed et al., "A Survey on Mobile Edge Computing," *10th IEEE International Conference on intelligent Systems and Control(ISCO'16)*, India. (8 pages).

(Continued)

*Primary Examiner* — Mahmoud Gimie
(74) *Attorney, Agent, or Firm* — Seed IP Law Group LLP

(57) ABSTRACT

A method of predicting, in real-time, a relationship between a vehicle's engine speed, trip time, cost, and fuel consumption, comprising: monitoring vehicle operation over time to acquiring data representing at least a vehicle location, a fuel consumption rate, and operating conditions; generating a predictive model relating the vehicle's engine speed, trip time, and fuel consumption; and receiving at least one constraint on the vehicle's engine speed, trip time, and fuel consumption, and automatically producing from at least one automated processor, based on the predictive model, a constrained output.

28 Claims, 17 Drawing Sheets

Regular Cruising operation

(56) References Cited

U.S. PATENT DOCUMENTS

| | | |
|---|---|---|
| 4,165,795 A | 8/1979 | Lynch et al. |
| 4,212,066 A | 7/1980 | Carp et al. |
| 4,240,381 A | 12/1980 | Lowther |
| 4,286,324 A | 8/1981 | Ingram |
| 4,303,377 A | 12/1981 | Schwartzman |
| 4,307,450 A | 12/1981 | Carp et al. |
| 4,333,548 A | 6/1982 | Jones |
| 4,341,984 A | 7/1982 | Parker et al. |
| 4,354,144 A | 10/1982 | McCarthy |
| 4,364,265 A | 12/1982 | Dickson |
| 4,436,482 A | 3/1984 | Inoue et al. |
| 4,469,055 A | 9/1984 | Caswell |
| 4,661,714 A | 4/1987 | Satterthwaite et al. |
| 4,742,681 A | 5/1988 | Haberkern et al. |
| 4,777,866 A | 10/1988 | Tan |
| 4,796,592 A | 1/1989 | Höfer et al. |
| 4,854,274 A | 8/1989 | Dingess |
| 4,858,569 A | 8/1989 | Cser et al. |
| 4,939,898 A | 7/1990 | Ichimura et al. |
| 4,994,188 A | 2/1991 | Prince |
| 5,076,229 A | 12/1991 | Stanley |
| 5,097,814 A | 3/1992 | Smith |
| 5,165,373 A | 11/1992 | Cheng |
| 5,195,469 A | 3/1993 | Syed |
| 5,259,344 A | 11/1993 | Huang et al. |
| 5,266,009 A | 11/1993 | Tasaki et al. |
| 5,474,036 A | 12/1995 | Hansen et al. |
| 5,520,161 A | 5/1996 | Klopp |
| 5,632,144 A | 5/1997 | Isobe |
| 5,658,176 A | 8/1997 | Jordan |
| 5,679,035 A | 10/1997 | Jordan |
| 5,788,004 A | 8/1998 | Friedmann et al. |
| 5,832,897 A | 11/1998 | Zhang |
| 6,092,021 A | 7/2000 | Ehlbeck et al. |
| 6,213,089 B1 | 4/2001 | Cheng |
| 6,295,970 B1 | 10/2001 | Kawakami |
| 6,319,168 B1 | 11/2001 | Morris et al. |
| 6,325,047 B2 | 12/2001 | Kawakami |
| 6,359,421 B1 | 3/2002 | Mueller et al. |
| 6,390,059 B1 | 5/2002 | Shiraishi et al. |
| 6,418,365 B1 | 7/2002 | Löffler et al. |
| 6,427,659 B2 | 8/2002 | Shiraishi et al. |
| 6,497,223 B1 | 12/2002 | Tuken et al. |
| 6,512,983 B1 | 1/2003 | Bauer et al. |
| 6,520,144 B2 | 2/2003 | Shiraishi et al. |
| 6,564,546 B2 | 5/2003 | Brown |
| 6,588,258 B2 | 7/2003 | Ju |
| 6,641,365 B2 | 11/2003 | Karem |
| 6,732,706 B2 | 5/2004 | Shiraishi et al. |
| 6,752,733 B2 | 6/2004 | Rogers et al. |
| 6,804,997 B1 | 10/2004 | Schwulst |
| 6,955,081 B2 | 10/2005 | Schwulst |
| 6,973,792 B2 | 12/2005 | Hicks |
| 6,990,855 B2 | 1/2006 | Tuken et al. |
| 7,013,863 B2 | 3/2006 | Shiraishi et al. |
| 7,121,253 B2 | 10/2006 | Shiraishi et al. |
| 7,143,580 B2 | 12/2006 | Ge |
| 7,225,793 B2 | 6/2007 | Schwulst et al. |
| 7,325,532 B2 | 2/2008 | Dölker |
| 7,392,129 B2 | 6/2008 | Hill et al. |
| 7,460,958 B2 | 12/2008 | Walsh et al. |
| 7,488,357 B2 | 2/2009 | Tavlarides et al. |
| 7,542,842 B2 | 6/2009 | Hill et al. |
| 8,155,868 B1 | 4/2012 | Xing et al. |
| 8,196,686 B2 | 6/2012 | Grieve |
| 8,291,587 B2 | 10/2012 | St. Mary |
| 8,384,397 B2 | 2/2013 | Bromberg et al. |
| 8,418,462 B2 | 4/2013 | Piper |
| 8,442,729 B2 | 5/2013 | Tsukada et al. |
| 8,514,061 B2 | 8/2013 | Wagner |
| 8,534,401 B2 | 9/2013 | Dimitrov et al. |
| 8,539,764 B2 | 9/2013 | Howard |
| 8,608,620 B2 | 12/2013 | Kim et al. |
| 8,640,437 B1 | 2/2014 | Brostmeyer |
| 8,955,474 B1 | 2/2015 | Derbin et al. |
| 8,996,290 B2 | 3/2015 | Robl et al. |
| 9,260,838 B2 | 2/2016 | Sawada et al. |
| 9,266,542 B2 | 2/2016 | Daum et al. |
| 9,267,454 B2 | 2/2016 | Wilcutts et al. |
| 9,371,629 B2 | 6/2016 | Kim |
| 9,399,185 B2 | 7/2016 | Bromberg et al. |
| 9,424,521 B2 | 8/2016 | Bloomquist et al. |
| 9,441,532 B2 | 9/2016 | Pegg et al. |
| 9,512,794 B2 | 12/2016 | Serrano et al. |
| 9,574,492 B2 | 2/2017 | Owens |
| 9,586,805 B1 | 3/2017 | Shock |
| 9,592,964 B2 | 3/2017 | Göllü |
| 9,637,111 B2 | 5/2017 | Nikovski et al. |
| 9,638,537 B2 | 5/2017 | Abramson et al. |
| 9,674,880 B1 | 6/2017 | Egner et al. |
| 9,711,050 B2 | 7/2017 | Ansari |
| 9,764,732 B2 | 9/2017 | Kim et al. |
| 9,775,562 B2 | 10/2017 | Egner et al. |
| 9,790,080 B1 | 10/2017 | Shock |
| 9,792,259 B2 | 10/2017 | Heinz et al. |
| 9,792,575 B2 | 10/2017 | Khasis |
| 9,815,683 B1 | 11/2017 | Kalala et al. |
| 9,819,296 B2 | 11/2017 | Bailey et al. |
| 9,836,056 B2 | 12/2017 | Ansari |
| 9,882,987 B2 | 1/2018 | Kodaypak et al. |
| 9,889,840 B2 | 2/2018 | Jeong et al. |
| 9,904,264 B2 | 2/2018 | Mummigatti |
| 9,904,900 B2 | 2/2018 | Cao |
| 9,906,381 B2 | 2/2018 | Mummigatti |
| 9,923,124 B2 | 3/2018 | Mazed et al. |
| 9,932,220 B1 | 4/2018 | Shock |
| 9,932,925 B2 | 4/2018 | Ra |
| 9,946,262 B2 | 4/2018 | Ansari |
| 9,981,840 B2 | 5/2018 | Shock |
| 9,984,134 B2 | 5/2018 | Imai et al. |
| 9,992,701 B2 | 6/2018 | Egner et al. |
| 10,007,513 B2 | 6/2018 | Malladi et al. |
| 10,014,812 B2 | 7/2018 | Bailey et al. |
| 10,034,066 B2 | 7/2018 | Tran et al. |
| 10,056,008 B1 | 8/2018 | Sweany et al. |
| 10,075,834 B1 | 9/2018 | Kodaypak et al. |
| 10,087,065 B2 | 10/2018 | Shock |
| 10,089,370 B2 | 10/2018 | Imai et al. |
| 10,089,610 B2 | 10/2018 | Chow et al. |
| 10,091,276 B2 | 10/2018 | Bloomquist et al. |
| 10,106,237 B2 | 10/2018 | Kaiser et al. |
| 10,111,272 B1 | 10/2018 | Withers et al. |
| 10,422,290 B1* | 9/2019 | Liao-McPherson ... F02M 26/05 |
| 2001/0015194 A1 | 8/2001 | Shiraishi et al. |
| 2001/0032617 A1 | 10/2001 | Kawakami |
| 2002/0055815 A1 | 5/2002 | Ju |
| 2002/0144671 A1 | 10/2002 | Shiraishi et al. |
| 2003/0139248 A1 | 7/2003 | Rogers et al. |
| 2004/0011325 A1 | 1/2004 | Benson et al. |
| 2004/0125216 A1 | 7/2004 | Keskar et al. |
| 2004/0134268 A1 | 7/2004 | Tuken et al. |
| 2004/0155468 A1 | 8/2004 | Yang |
| 2004/0159721 A1 | 8/2004 | Shiraishi et al. |
| 2005/0039526 A1 | 2/2005 | Schwulst |
| 2005/0169743 A1 | 8/2005 | Hicks |
| 2006/0086089 A1 | 4/2006 | Ge |
| 2006/0107586 A1 | 5/2006 | Tavlarides et al. |
| 2006/0118079 A1 | 6/2006 | Shiraishi et al. |
| 2006/0118086 A1 | 6/2006 | Schwulst et al. |
| 2006/0155486 A1 | 7/2006 | Walsh et al. |
| 2007/0073467 A1 | 3/2007 | Hill et al. |
| 2007/0142997 A1 | 6/2007 | Dolker |
| 2008/0034720 A1 | 2/2008 | Helfrich et al. |
| 2008/0047272 A1 | 2/2008 | Schoell |
| 2008/0306636 A1 | 12/2008 | Caspe-Detzer et al. |
| 2008/0306674 A1 | 12/2008 | Hill et al. |
| 2009/0017987 A1 | 1/2009 | Satou et al. |
| 2009/0320461 A1 | 12/2009 | Morinaga et al. |
| 2010/0018479 A1 | 1/2010 | Hu |
| 2010/0018480 A1 | 1/2010 | Hu |
| 2010/0101409 A1 | 4/2010 | Bromberg et al. |
| 2010/0138118 A1 | 6/2010 | Tsukada et al. |
| 2010/0206721 A1 | 8/2010 | Snidvongs |
| 2010/0313418 A1 | 12/2010 | St. Mary |

(56) References Cited

U.S. PATENT DOCUMENTS

| | | |
|---|---|---|
| 2010/0318247 A1 | 12/2010 | Kumar |
| 2011/0088386 A1 | 4/2011 | Howard |
| 2011/0148614 A1 | 6/2011 | Wagner |
| 2011/0282561 A1 | 11/2011 | Mitani et al. |
| 2011/0283695 A1 | 11/2011 | Piper |
| 2012/0022734 A1 | 1/2012 | Choi et al. |
| 2012/0191280 A1 | 7/2012 | Ohno |
| 2012/0221227 A1 | 8/2012 | Alfieri et al. |
| 2013/0125745 A1 | 5/2013 | Bromberg et al. |
| 2013/0151115 A1 | 6/2013 | Lee |
| 2013/0160744 A1 | 6/2013 | Giovenga |
| 2014/0007574 A1 | 1/2014 | Pegg et al. |
| 2014/0039768 A1 | 2/2014 | Sawada et al. |
| 2014/0041626 A1 | 2/2014 | Wilcutts et al. |
| 2014/0165561 A1 | 6/2014 | Kingsbury |
| 2014/0290595 A1 | 10/2014 | Owens |
| 2014/0336905 A1 | 11/2014 | Kim |
| 2015/0046060 A1 | 2/2015 | Nikovski et al. |
| 2015/0169714 A1 | 6/2015 | Imai et al. |
| 2015/0233279 A1 | 8/2015 | Derbin et al. |
| 2015/0293981 A1 | 10/2015 | Imai et al. |
| 2015/0339586 A1 | 11/2015 | Adjaoute |
| 2015/0344036 A1 | 12/2015 | Kristinsson et al. |
| 2015/0381648 A1 | 12/2015 | Mathis |
| 2016/0016525 A1 | 1/2016 | Chauncey et al. |
| 2016/0107650 A1 | 4/2016 | Jeong et al. |
| 2016/0108805 A1 | 4/2016 | Ferguson et al. |
| 2016/0117785 A1 | 4/2016 | Lerick et al. |
| 2016/0137208 A1 | 5/2016 | Powers et al. |
| 2016/0159339 A1 | 6/2016 | Cho et al. |
| 2016/0159364 A1 | 6/2016 | Wilcutts et al. |
| 2016/0160786 A1 | 6/2016 | Ra |
| 2016/0196527 A1 | 7/2016 | Bose et al. |
| 2016/0201586 A1 | 7/2016 | Serrano et al. |
| 2016/0216130 A1 | 7/2016 | Abramson et al. |
| 2016/0217381 A1 | 7/2016 | Bloomquist et al. |
| 2016/0221578 A1 | 8/2016 | Tang et al. |
| 2016/0269436 A1 | 9/2016 | Danielson et al. |
| 2016/0288782 A1 | 10/2016 | Kim et al. |
| 2016/0334767 A1 | 11/2016 | Mummigatti |
| 2016/0337198 A1 | 11/2016 | Mummigatti |
| 2016/0337441 A1 | 11/2016 | Bloomquist et al. |
| 2016/0349330 A1 | 12/2016 | Barfield, Jr. et al. |
| 2016/0357187 A1 | 12/2016 | Ansari |
| 2016/0357188 A1 | 12/2016 | Ansari |
| 2016/0357262 A1 | 12/2016 | Ansari |
| 2016/0358084 A1 | 12/2016 | Bloomquist et al. |
| 2016/0358477 A1 | 12/2016 | Ansari |
| 2016/0362096 A1 | 12/2016 | Nikovski et al. |
| 2016/0364678 A1 | 12/2016 | Cao |
| 2016/0364679 A1 | 12/2016 | Cao |
| 2016/0364812 A1 | 12/2016 | Cao |
| 2016/0364823 A1 | 12/2016 | Cao |
| 2017/0018688 A1 | 1/2017 | Mazed et al. |
| 2017/0022015 A1 | 1/2017 | Göllü |
| 2017/0034644 A1 | 2/2017 | Chennakeshu |
| 2017/0037790 A1 | 2/2017 | Kim et al. |
| 2017/0046669 A1 | 2/2017 | Chow et al. |
| 2017/0051689 A1 | 2/2017 | Serrano et al. |
| 2017/0060567 A1 | 3/2017 | Kim et al. |
| 2017/0060574 A1 | 3/2017 | Malladi et al. |
| 2017/0080931 A1* | 3/2017 | D'Amato ............... B60W 10/06 |
| 2017/0142204 A1 | 5/2017 | Kodaypak et al. |
| 2017/0151928 A1 | 6/2017 | Kang et al. |
| 2017/0159556 A1 | 6/2017 | Owens |
| 2017/0176958 A1 | 6/2017 | Binotto et al. |
| 2017/0177546 A1 | 6/2017 | Heinz et al. |
| 2017/0184315 A1 | 6/2017 | Nolan et al. |
| 2017/0185956 A1 | 6/2017 | Göllü |
| 2017/0198458 A1 | 7/2017 | Cho et al. |
| 2017/0200324 A1 | 7/2017 | Chennakeshu |
| 2017/0208540 A1 | 7/2017 | Egner et al. |
| 2017/0211453 A1 | 7/2017 | Sappok et al. |
| 2017/0214760 A1 | 7/2017 | Lee et al. |
| 2017/0234691 A1 | 8/2017 | Abramson et al. |
| 2017/0238346 A1 | 8/2017 | Egner et al. |
| 2017/0260920 A1 | 9/2017 | Nakada |
| 2017/0262790 A1 | 9/2017 | Khasis |
| 2017/0262820 A1 | 9/2017 | Al Salah |
| 2017/0269599 A1 | 9/2017 | Ansari |
| 2017/0272972 A1 | 9/2017 | Egner et al. |
| 2017/0279957 A1 | 9/2017 | Abramson et al. |
| 2017/0286572 A1 | 10/2017 | Hershey et al. |
| 2017/0287335 A1 | 10/2017 | Ansari |
| 2017/0318360 A1 | 11/2017 | Tran et al. |
| 2017/0323249 A1 | 11/2017 | Khasis |
| 2017/0328679 A1 | 11/2017 | Smith |
| 2017/0328680 A1 | 11/2017 | Smith |
| 2017/0328681 A1 | 11/2017 | Smith |
| 2017/0328682 A1 | 11/2017 | Smith |
| 2017/0328683 A1 | 11/2017 | Smith |
| 2017/0344620 A1 | 11/2017 | Modarresi |
| 2018/0005178 A1 | 1/2018 | Göllü |
| 2018/0017405 A1 | 1/2018 | Chen et al. |
| 2018/0020477 A1 | 1/2018 | Neubacher |
| 2018/0023489 A1 | 1/2018 | Webb et al. |
| 2018/0025408 A1 | 1/2018 | Xu et al. |
| 2018/0025430 A1 | 1/2018 | Perl et al. |
| 2018/0032836 A1 | 2/2018 | Hurter |
| 2018/0038703 A1 | 2/2018 | Verma et al. |
| 2018/0047107 A1 | 2/2018 | Perl et al. |
| 2018/0054376 A1 | 2/2018 | Hershey et al. |
| 2018/0073459 A1 | 3/2018 | Han et al. |
| 2018/0075380 A1 | 3/2018 | Perl et al. |
| 2018/0091506 A1 | 3/2018 | Chow et al. |
| 2018/0095470 A1 | 4/2018 | Ansari |
| 2018/0097883 A1 | 4/2018 | Chow et al. |
| 2018/0099855 A1 | 4/2018 | Kalala et al. |
| 2018/0099858 A1 | 4/2018 | Shock |
| 2018/0099862 A1 | 4/2018 | Shock |
| 2018/0099863 A1 | 4/2018 | Shock |
| 2018/0099864 A1 | 4/2018 | Shock |
| 2018/0101183 A1 | 4/2018 | Shock |
| 2018/0101184 A1 | 4/2018 | Shock |
| 2018/0108023 A1 | 4/2018 | Stewart et al. |
| 2018/0108942 A1 | 4/2018 | Oh |
| 2018/0121903 A1 | 5/2018 | Al Salah |
| 2018/0122234 A1 | 5/2018 | Nascimento et al. |
| 2018/0122237 A1 | 5/2018 | Nascimento et al. |
| 2018/0137219 A1 | 5/2018 | Goldfarb et al. |
| 2018/0158020 A1 | 6/2018 | Khasis |
| 2018/0171592 A1 | 6/2018 | Yun et al. |
| 2018/0176329 A1 | 6/2018 | Chen et al. |
| 2018/0176663 A1 | 6/2018 | Damaggio |
| 2018/0176664 A1 | 6/2018 | Damaggio |
| 2018/0183661 A1 | 6/2018 | Wouhaybi et al. |
| 2018/0188704 A1 | 7/2018 | Cella et al. |
| 2018/0188714 A1 | 7/2018 | Cella et al. |
| 2018/0188715 A1 | 7/2018 | Cella et al. |
| 2018/0189332 A1 | 7/2018 | Asher et al. |
| 2018/0189344 A1 | 7/2018 | Akwule et al. |
| 2018/0189659 A1* | 7/2018 | Manna ................ G06F 11/3089 |
| 2018/0189717 A1 | 7/2018 | Cao |
| 2018/0195254 A1 | 7/2018 | Yun et al. |
| 2018/0197418 A1 | 7/2018 | Chu et al. |
| 2018/0202379 A1 | 7/2018 | Nagashima et al. |
| 2018/0210425 A1 | 7/2018 | Cella et al. |
| 2018/0210426 A1 | 7/2018 | Cella et al. |
| 2018/0210427 A1 | 7/2018 | Cella et al. |
| 2018/0215380 A1 | 8/2018 | Devi |
| 2018/0218452 A1 | 8/2018 | Guensler et al. |
| 2018/0229998 A1 | 8/2018 | Shock |
| 2018/0230919 A1 | 8/2018 | Nagashima et al. |
| 2018/0253073 A1 | 9/2018 | Cella et al. |
| 2018/0253074 A1 | 9/2018 | Cella et al. |
| 2018/0253075 A1 | 9/2018 | Cella et al. |
| 2018/0255374 A1 | 9/2018 | Cella et al. |
| 2018/0255375 A1 | 9/2018 | Cella et al. |
| 2018/0255376 A1 | 9/2018 | Cella et al. |
| 2018/0255377 A1 | 9/2018 | Cella et al. |
| 2018/0255378 A1 | 9/2018 | Cella et al. |
| 2018/0255379 A1 | 9/2018 | Cella et al. |
| 2018/0255380 A1 | 9/2018 | Cella et al. |
| 2018/0255381 A1 | 9/2018 | Cella et al. |

(56) References Cited

U.S. PATENT DOCUMENTS

| | | |
|---|---|---|
| 2018/0255382 A1 | 9/2018 | Cella et al. |
| 2018/0255383 A1 | 9/2018 | Cella et al. |
| 2018/0262574 A1 | 9/2018 | Choi et al. |
| 2018/0270121 A1 | 9/2018 | Stringfellow |
| 2018/0274927 A1 | 9/2018 | Epperlein et al. |
| 2018/0279032 A1 | 9/2018 | Boesen |
| 2018/0284735 A1 | 10/2018 | Cella et al. |
| 2018/0284736 A1 | 10/2018 | Cella et al. |
| 2018/0284737 A1 | 10/2018 | Cella et al. |
| 2018/0284741 A1 | 10/2018 | Cella et al. |
| 2018/0284742 A1 | 10/2018 | Cella et al. |
| 2018/0284743 A1 | 10/2018 | Cella et al. |
| 2018/0284744 A1 | 10/2018 | Cella et al. |
| 2018/0284745 A1 | 10/2018 | Cella et al. |
| 2018/0284746 A1 | 10/2018 | Cella et al. |
| 2018/0284747 A1 | 10/2018 | Cella et al. |
| 2018/0284749 A1 | 10/2018 | Cella et al. |
| 2018/0284752 A1 | 10/2018 | Cella et al. |
| 2018/0284753 A1 | 10/2018 | Cella et al. |
| 2018/0284754 A1 | 10/2018 | Cella et al. |
| 2018/0284755 A1 | 10/2018 | Cella et al. |
| 2018/0284756 A1 | 10/2018 | Cella et al. |
| 2018/0284757 A1 | 10/2018 | Cella et al. |
| 2018/0284758 A1 | 10/2018 | Cella et al. |
| 2018/0288586 A1 | 10/2018 | Tran et al. |
| 2018/0288641 A1 | 10/2018 | Mildh et al. |
| 2018/0290877 A1 | 10/2018 | Shock |
| 2018/0293816 A1 | 10/2018 | Garrett et al. |
| 2018/0299878 A1 | 10/2018 | Cella et al. |
| 2018/0300124 A1 | 10/2018 | Malladi et al. |
| 2018/0308371 A1 | 10/2018 | Cao et al. |
| 2018/0355811 A1* | 12/2018 | Li .......................... F02M 26/52 |
| 2019/0100217 A1* | 4/2019 | Livshiz ................. B60W 10/06 |

OTHER PUBLICATIONS

Atkinson et al., "Dynamic Model-Based Calibration Optimization: An Introduction and Application to Diesel Engines," *SAE Technical Paper Series*, 2005-01-0026, 2005. (15 pages).

Atkinson et al., "Using Model-Based Rapid Transient Calibration to Reduce Fuel Consumption and Emissions in Diesel Engines," *SAE Technical Paper Series*, 2008-01-1365, 2008. (18 pages).

Augustin et al., "On Quantile Quantile plots for Generalized linear models," Computational Statistics & Data Analysis, 56(8):2404-2409, 2012. (14 pages).

Cuadrado-Cordero, "Microclouds: an approach for a network-aware energy-efficient decentralised cloud," *HAL archives-ouvertes*, PhD thesis submitted Mar. 29, 2017. (152 pages).

Edge Computing—Microsoft Research, Oct. 29, 2008 Retrieved Sep. 24, 2018. (4 pages).

Fahrmeir et al., "Bayesian inference for generalized additive mixed models based on Markov random field priors," *Appl. Statist* 50(2):201-220, 2001.

Felde, "On edge architecture," *Blog of Christian Felde Technology, computers and quant finance*, Dec. 20, 2017. (2 pages) https://blog.cfelde.com/2017/12/on-edge-architecture/.

Gai et al., "Dynamic energy-aware cloudlet-based mobile cloud computing model for green computing," *Journal of Network and Computer Applications* 59:46-54, 2016.

Gu et al., "Minimizing GCV/GML Scores With Multiple Smoothing Parameters Via The Newton Method," *Siam J. Sci. Stat. Comput.* 12(2):383-398, 1991.

Gu, "Smoothing Spline ANOVA Models: R Package gss," *Journal of Statistical Software*, 58(5), 2014. (25 pages).

Johnson et al., "HEV Control Strategy for Real-Time Optimization of Fuel Economy and Emissions," *SAE Technical Paper* No. 2000-01-1543, 2000. (15 pages).

Junker, "Additive models and cross-validation," 36-490, Mar. 22, 2010. (10 pages).

Kim et al., "Smoothing Spline Gaussian Regression: More Scalable Computation via Efficient Approximation," *Journal of the royal Statistical Society, Series B*. 66:337-356,2004.

Knafl et al., "Dual-Use Engine Calibration," *SAE Technical Paper No. 2005-01-1549*, 2005. (15 pages).

Kumar et al., "Multi-objective modeling of production and pollution routing problem with time window: A self-learning particle swarm optimization approach," *Computers & Industrial Engineering* 99:29-40, 2016.

Lopez et al., "Edge-centric Computing: Vision and Challenges," *ACM SIGCOMM Computer Communication Review*, 45(5):37-42, 2015.

Marra et al., "Coverage Properties of Confidence Intervals for Generalized Additive Model Components," *Scandinavian Journal of Statistics*, 39(1):53-74, 2012. (25 pages).

Mobile-Edge Computing—Introductory Technical White Paper, *ETSI*, Issue 1, 2014. (36 pages).

Nelder et al., "Generalized Linear Models," *Journal of the Royal Statistical Society. Series A (General)*, 135(3):370-384, 1972. (16 pages).

Payo et al., "Control Applied to a Reciprocating Internal Combustion Engine Test Bench under Transient Operation: Impact on Engine Performance and Pollutant Emissions," *Energies* 10:1690, 2017. (17 pages).

Rask et al., "Simulation-Based Engine Calibration: Tools, Techniques, and Applications," No. 2004-01-1264, *SAE Technical Paper*, 2004. (14 pages).

Reiss et al., "Smoothing Parameter Selection for a Class of Semiparametric Linear Models," *Journal of the Royal Statistical Society , Series B*. 71:505-523, 2009. (34 pages).

Rigby et al., "Generalized additive models for location, scale and shape," *Appl. Statist.* 54(3): 507-554, 2005.

Rue et al., "Approximate Bayesian inference for latent Gaussian models by using integrated nested Laplace approximations," *J. R. Statist. Soc. B*. 71(2):319-392, 2009.

Schmid et al., "Boosting Additive Models using Component-wise P-Splines," *Computational statistics and Data Analysis* 53:298-311, 2008.

Schumaker, "Spline Models for Observational Data," *SIAM Rev.* 33(3):502, 1991.

Senn, "A Conversation with John Nelder," *Statistical Science* 18(1):118-131, 2003.

Serrano et al., "Analysis of the capabilities of a two-stage turbocharging system to fulfil the US2007 anti-pollution directive for heavy duty diesel engines," *International Journal of Automotive Technology* 9(3):277-288, 2008.

Silverman, "Some Aspects of the Spline Smoothing Approach to Non-Parametric Regression Curve Fitting," *Journal of the Royal Statistical Society. Series B (Methodological)*, 47(1), 1985. (53 pages).

Skala et al., "Scalable Distributed Computing Hierarchy: Cloud, Fog and Dew Computing," *Open Journal of Cloud Computing (OJCC)* 2(1):16-24, 2015.

Traver et al., "Neural Network-Based Diesel Engine Emissions Prediction Using In-Cylinder Combustion Pressure," *SAE Technical Paper*, No. 1999-01-1532, 1999. (18 pages).

Umlauf et al., "Structured Additive Regression Models: An R Interface to BayesX," *Journal of Statistical Software* 63(21), 2012. (49 pages).

Wahba, "Bayesian "Confidence Intervals" for the Cross-validated Smoothing Spline," *J.R. Statist. Soc. B* 45(1):133-150, 1983.

Wood, "Modelling and smoothing parameter estimation with multiple quadratic penalties," *J.R. Statist. Soc. B* 62(2):413-428, 2000. (18 pages).

Wood, "Fast stable direct fitting and smoothness selection for Generalized Additive Models," *Journal of the Royal Statistical Society, Series B*. 70(3):495-518, 2008.

Wood, "Fast stable REML and ML estimation of semiparametric GLMs," *Journal of the Royal Statistical Society, Series B*. 73:3-36, 2011.

Yuan et al., "Multi-sliding surface control for the speed regulation system of ship diesel engines," *Transactions of the Institute of Measurement and Control* 40(1):22-34, 2018.

Zeger et al., "Models for Longitudinal Data: A Generalized Estimating Equation Approach," *Biometrics* 44(4):1049-1060, 1988.

(56) References Cited

OTHER PUBLICATIONS

International Search Report and Written Opinion for PCT Application No. PCT/US2019/060618, dated Jan. 17, 2020, 18 pages.

* cited by examiner

Regular Cruising operation

Regular Cruising operation

Regular Cruising operation

Fish Trawling operation

Fish Trawling operation

Fleet Fuel Usage per 6 Months

Fleet Non-methane Volatile Organic Compounds per 6 Months

Individual Vessel Nitrogen Oxides Near a Major City per 6 Months

Fleet Nitrogen Oxides per 6 Months

Fleet Particulate Matter per 6 Months

Flow chart of data pre-processing for model generation

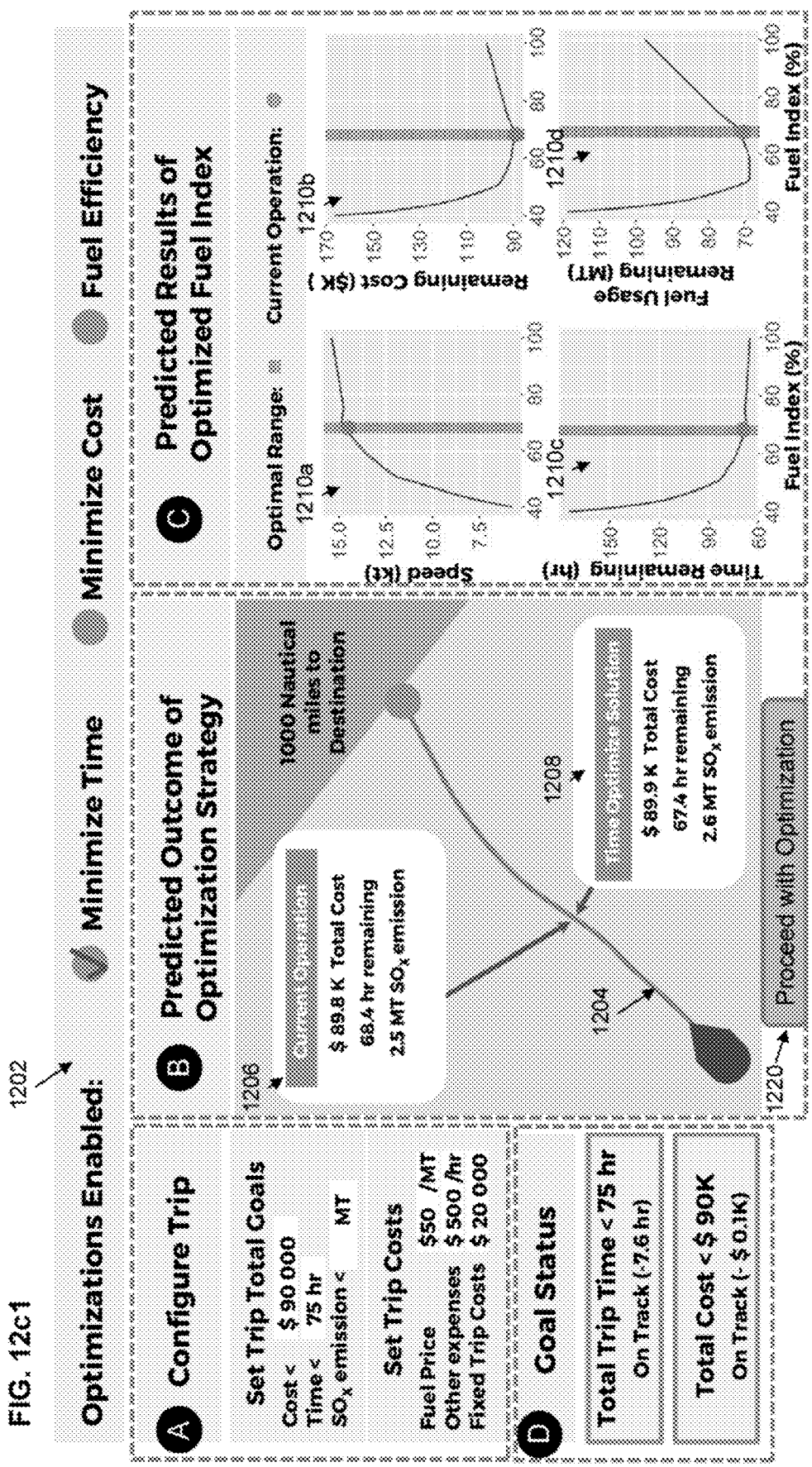
FIG. 12c1

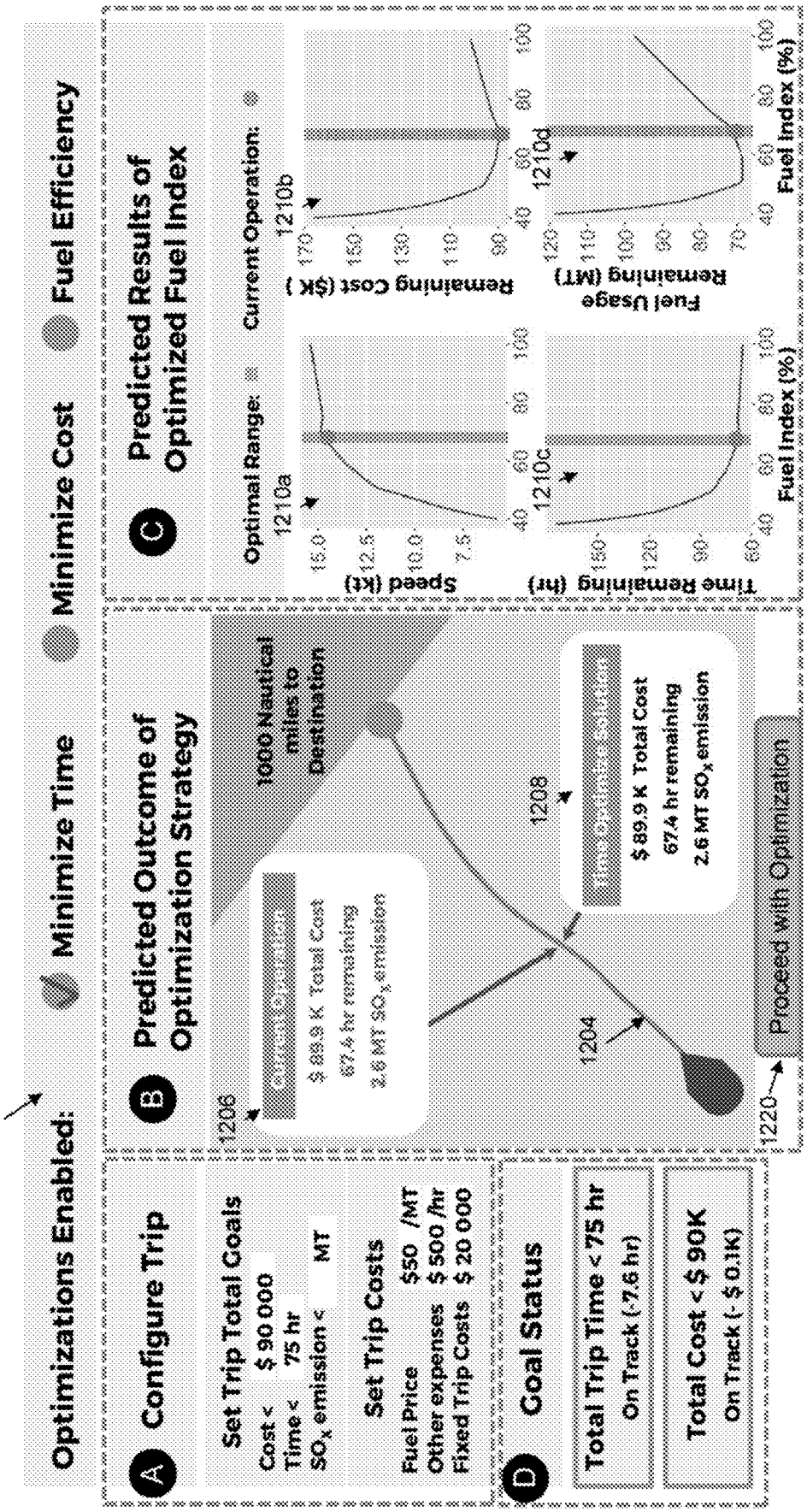
FIG. 12c2

PREDICTION, PLANNING, AND OPTIMIZATION OF TRIP TIME, TRIP COST, AND/OR POLLUTANT EMISSION FOR A VEHICLE USING MACHINE LEARNING

CROSS-REFERENCE TO RELATED APPLICATIONS

This Application claims the benefit of provisional U.S. Application No. 62/758,385, filed Nov. 9, 2018 and entitled "USE OF MACHINE LEARNING FOR PREDICTION, PLANNING, AND OPTIMIZATION OF TIME, FUEL COST, AND/OR POLLUTANT EMISSIONS," which is hereby incorporated by reference in its entirety.

BACKGROUND

Fuel and its usage during a vessel's operations represent a substantial portion of operational cost of a vehicle, e.g., a marine vehicle during a marine voyage. Emitted pollutants also impose a cost, and may be limited by law or regulation. As is intuitive, voyage time is dependent on average vessel speed over the distance of the trip, which is typically determined, in part, by averaged instantaneous fuel usage. Less intuitive is that trip fuel usage is influenced by total trip time in many cases. Thus, there may be a non-intuitive and non-linear relationship between a vessel's speed, its total trip time, and total trip cost. A balance between cost, emissions, and trip time is needed to optimize operations for changing trip priorities and the state of the vessel and the environment.

Edge computing is a distributed computing paradigm in which computation is largely or completely performed on distributed device nodes known as smart devices or edge devices as opposed to primarily taking place in a centralized cloud environment. The eponymous "edge" refers to the geographic distribution of computing nodes in the network as Internet of Things devices, which are at the "edge" of an enterprise, metropolitan or other network. The motivation is to provide server resources, data analysis and artificial intelligence ("ambient intelligence") closer to data collection sources and cyber-physical systems such as smart sensors and actuators. Edge computing is seen as important in the realization of physical computing, smart cities, ubiquitous computing and the Internet of Things.

Edge computing is concerned with computation performed at the edge of networks, though typically also involves data collection and communication over networks.

Edge computing pushes applications, data and computing power (services) away from centralized points to the logical extremes of a network. Edge computing takes advantage of microservices architectures to allow some portion of applications to be moved to the edge of the network. While content delivery networks have moved fragments of information across distributed networks of servers and data stores, which may spread over a vast area, Edge Computing moves fragments of application logic out to the edge. As a technological paradigm, edge computing may be architecturally organized as peer-to-peer computing, autonomic (self-healing) computing, grid computing, and by other names implying non-centralized availability.

Edge computing is a method of optimizing applications or cloud computing systems by taking some portion of an application, its data, or services away from one or more central nodes (the "core") to the other logical extreme (the "edge") of the Internet which makes contact with the physical world or end users. In this architecture, according to one embodiment, specifically for Internet of things (IoT) devices, data comes in from the physical world via various sensors, and actions are taken to change physical state via various forms of output and actuators; by performing analytics and knowledge generation at the edge, communications bandwidth between systems under control and the central data center is reduced. Edge computing takes advantage of proximity to the physical items of interest and also exploits the relationships those items may have to each other. Another, broader way to define "edge computing" is to put any type of computer program that needs low latency nearer to the requests.

In some cases, edge computing requires leveraging resources that may not be continuously connected to a network such as autonomous vehicles, implanted medical devices, fields of highly distributed sensors, and mobile devices. Edge computing includes a wide range of technologies including wireless sensor networks, mobile data acquisition, mobile signature analysis, cooperative distributed peer-to-peer ad hoc networking and processing also classifiable as local cloud/fog computing and grid computing, dew computing, mobile edge computing, cloudlet, distributed data storage and retrieval, autonomic self-healing networks, remote cloud services, augmented reality, the Internet of Things and more. Edge computing can involve edge nodes directly attached to physical inputs and output or edge clouds that may have such contact but at least exist outside of centralized clouds closer to the edge.

See:
"Edge Computing—Microsoft Research". Microsoft Research. 2008-10-29. Retrieved 2018-09-24.
"Mobile-Edge-Computing White Paper" (PDF). ETSI.
Ahmed, Arif; Ahmed, Ejaz; A Survey on Mobile Edge Computing. India: 10th IEEE International Conference on Intelligent Systems and Control (ISCO'16), India.
Aksikas, A., I. Aksikas, R. E. Hayes, and J. F. Forbes. "Model-based optimal boundary control of selective catalytic reduction in diesel-powered vehicles." *Journal of Process Control* 71 (2018): 63-74.
Atkinson, Chris, and Gregory Mott. Dynamic model-based calibration optimization: An introduction and application to diesel engines. No. 2005-01-0026. SAE Technical Paper, 2005.
Atkinson, Chris, Marc Allain, and Houshun Zhang. Using model-based rapid transient calibration to reduce fuel consumption and emissions in diesel engines. No. 2008-01-1365. SAE Technical Paper, 2008.
Brahma, I., M. C. Sharp, I. B. Richter, and T. R. Frazier. "Development of the nearest neighbour multivariate localized regression modelling technique for steady state engine calibration and comparison with neural networks and global regression." *International Journal of Engine Research* 9, no. 4 (2008): 297-323.
Brahma, Indranil, and Christopher J. Rutland. *Optimization of diesel engine operating parameters using neural networks*. No. 2003-01-3228. SAE Technical Paper, 2003.
Brahma, Indranil, and John N. Chi. "Development of a model-based transient calibration process for diesel engine electronic control module tables—Part 1: data requirements, processing, and analysis." *International Journal of Engine Research* 13, no. 1 (2012): 77-96.
Brahma, Indranil, and John N. Chi. "Development of a model-based transient calibration process for diesel engine electronic control module tables—Part 2: modelling and optimization." *International Journal of Engine Research* 13, no. 2 (2012): 147-168.

Brahma, Indranil, Christopher J. Rutland, David E. Foster, and Yongsheng He. *A new approach to system level soot modeling.* No. 2005-01-1122. SAE Technical Paper, 2005.

Brahma, Indranil, Mike C. Sharp, and Tim R. Frazier. "Empirical modeling of transient emissions and transient response for transient optimization." *SAE International Journal of Engines* 2, no. 1 (2009): 1433-1443.

Brahma, Indranil, Yongsheng He, and Christopher J. Rutland. *Improvement of neural network accuracy for engine simulations.* No. 2003-01-3227. SAE Technical Paper, 2003.

Brooks, Thomas, Grant Lumsden, and H. Blaxill. Improving base engine calibrations for diesel vehicles through the use of DoE and optimization techniques. No. 2005-01-3833. SAE Technical Paper, 2005.

Burk, Reinhard, Frederic Jacquelin, and Russell Wakeman. *A contribution to predictive engine calibration based on vehicle drive cycle performance.* No. 2003-01-0225. SAE Technical Paper, 2003.

Cuadrado-Cordero, Ismael, "Microclouds: an approach for a network-aware energy-efficient decentralised cloud," Archived Jun. 28, 2018, at the Wayback Machine. PhD thesis, 2017.

Daum, Wolfgang, Glenn Robert Shaffer, Steven James Gray, David Ducharme, Ed Hall, Eric Dillen, Roy Primus, and Ajith Kumar. "System and method for optimized fuel efficiency and emission output of a diesel powered system." U.S. Pat. No. 9,266,542, issued Feb. 23, 2016.

Desantes, J. M., J. V. Benajes, S. A. Molina, and L. Herández. "Multi-objective optimization of heavy duty diesel engines under stationary conditions." *Proceedings of the Institution of Mechanical Engineers, Part D: Journal of Automobile Engineering* 219, no. 1 (2005): 77-87.

Desantes, Jose M., Jose J. Lopez, Jose M. Garcia, and Leonor Hernández. *Application of neural networks for prediction and optimization of exhaust emissions in a HD diesel engine.* No. 2002-01-1144. SAE Technical Paper, 2002.

Dimopoulos, Panayotis, A. Schoni, A. Eggimann, C. Sparti, E. Vaccarino, and C. Operti. *Statistical methods for solving the fuel consumption/emission conflict on DI-diesel engines.* No. 1999-01-1077. SAE Technical Paper, 1999.

Edge Computing—Pacific Northwest National Laboratory

Edwards, Simon P., A. D. Pilley, S. Michon, and G. Fournier. The Optimisation of Common Rail FIE Equipped Engines Through the Use of Statistical Experimental Design, Mathematical Modelling and Genetic Algorithms. No. 970346. SAE Technical Paper, 1997.

Felde, Christian. "On edge architecture".

Gaber, Mohamed Medhat; Stahl, Frederic; Gomes, Joao Bártolo (2014). Pocket Data Mining—Big Data on Small Devices (1 ed.). Springer International Publishing. ISBN 978-3-319-02710-4.

Gai, Keke; Meikang Qiu; Hui Zhao; Lixin Tao; Ziliang Zong (2016). "Mobile cloud computing: Dynamic energy-aware cloudlet-based mobile cloud computing model for green computing". 59: 46-54. doi:10.1016/j.jnca.2015.05.016. PDF Garcia Lopez, Pedro; Montresor, Alberto; Epema, Dick; Datta, Anwitaman; Higashino, Teruo; Iamnitchi, Adriana; Barcellos, Marinho; Felber, Pascal; Riviere, Etienne (2015-09-30). "Edge-centric Computing: Vision and Challenges". ACM SIGCOMM Computer Communication Review. 45 (5): 37-42. doi:10.1145/2831347.2831354. ISSN 0146-4833.

He, Y., and C. J. Rutland. "Application of artificial neural networks in engine modelling." *International Journal of Engine Research* 5, no. 4 (2004): 281-296.

Hentschel, Robert, R-M. Cernat, and J-U. Varchmin. *In-car modelling of emissions with dynamic artificial neural networks.* No. 2001-01-3383. SAE Technical Paper, 2001.

Johnson, Valerie H., Keith B. Wipke, and David J. Rausen. *HEV control strategy for real-time optimization of fuel economy and emissions.* No. 2000-01-1543. SAE Technical Paper, 2000.

Knafl, Alexander, Jonathan R. Hagena, Zoran Filipi, and Dennis N. Assanis. *Dual-Use Engine Calibration.* No. 2005-01-1549. SAE Technical Paper, 2005.

Kouremenos, D. A., C. D. Rakopoulos, and D. T. Hountalas. Multi-zone combustion modelling for the prediction of pollutants emissions and performance of DI diesel engines. No. 970635. SAE Technical Paper, 1997.

Kumar, Ravi Shankar, Karthik Kondapaneni, Vijaya Dixit, A. Goswami, Lakshman S. Thakur, and M. K. Tiwari. "Multi-objective modeling of production and pollution routing problem with time window: A self-learning particle swarm optimization approach." *Computers & Industrial Engineering* 99 (2016): 29-40.

Leung, Dennis Y C, Yufei Luo, and Tzu-Liang Chan. "Optimization of exhaust emissions of a diesel engine fuelled with biodiesel." *Energy & fuels* 20, no. 3 (2006): 1015-1023.

Li, Jiehui, Bingbing Wu, and Gongping Mao. "Research on the performance and emission characteristics of the LNG-diesel marine engine." *Journal of Natural Gas Science and Engineering* 27 (2015): 945-954.

Lichtenthaler, D., M. Ayeb, H. J. Theuerkauf, and T. Winsel. *Improving real-time SI engine models by integration of neural approximators.* No. 1999-01-1164. SAE Technical Paper, 1999.

Mizythras, P., E. Boulougouris, and G. Theotokatos. "Numerical study of propulsion system performance during ship acceleration." *Ocean Engineering* 149 (2018): 383-396.

Mobasheri, Raouf, Zhijun Peng, and Seyed Mostafa Mirsalim. "Analysis the effect of advanced injection strategies on engine performance and pollutant emissions in a heavy duty DI-diesel engine by CFD modeling." *International Journal of Heat and Fluid Flow* 33, no. 1 (2012): 59-69.

Montgomery, David T., and Rolf D. Reitz. Optimization of heavy-duty diesel engine operating parameters using a response surface method. No. 2000-01-1962. *SAE Technical Paper,* 2000.

Müller, Rainer, and Bernd Schneider. *Approximation and control of the engine torque using neural networks.* No. 2000-01-0929. SAE Technical Paper, 2000.

Nozaki, Yusuke, Takao Fukuma, and Kazuo Tanaka. Development of a rule-based calibration method for diesel engines. No. 2005-01-0044. SAE Technical Paper, 2005.

Payo, Ismael, Luis Sanchez, Enrique Carlo, and Octavio Armas. "Control Applied to a Reciprocating Internal Combustion Engine Test Bench under Transient Operation: Impact on Engine Performance and Pollutant Emissions." Energies 10, no. 11 (2017): 1690.

Qiang, Han, Yang Fuyuan, Zhou Ming, and Ouyang Minggao. *Study on modeling method for common rail diesel engine calibration and optimization.* No. 2004-01-0426. SAE Technical Paper, 2004.

Rakopoulos, Constantine D., and D. T. Hountalas. Development and validation of a 3-D multi-zone combustion model for the prediction of DI diesel engines performance and pollutants emissions. No. 981021. SAE Technical Paper, 1998.

Rask, Eric, and Mark Sellnau. *Simulation-based engine calibration: tools, techniques, and applications*. No. 2004-01-1264. SAE Technical Paper, 2004.

Schmitz, Gunter, U. Oligschlager, G. Eifler, and H. Lechner. *Automated system for optimized calibration of engine management systems*. No. 940151. SAE Technical Paper, 1994.

Serrano, J. R., F. J. Arnau, V. Dolz, A. Tiseira, M. Lejeune, and N. Auffret. "Analysis of the capabilities of a two-stage turbocharging system to fulfil the US2007 anti-pollution directive for heavy duty diesel engines." *International Journal of Automotive Technology* 9, no. 3 (2008): 277-288.

Skala, Karolj; Davidovie, Davor; Afgan, Enis; Sovie, Ivan; Sojat, Zorislav (2015). "Scalable Distributed Computing Hierarchy: Cloud, Fog and Dew Computing". Open Journal of Cloud Computing. RonPub. 2 (1): 16-24. ISSN 2199-1987. Retrieved 1 Mar. 2016.

Traver, Michael L., Richard J. Atkinson, and Christopher M. Atkinson. *Neural network-based diesel engine emissions prediction using in-cylinder combustion pressure*. No. 1999-01-1532. SAE Technical Paper, 1999.

Wong, Pak Kin, Ka In Wong, Chi Man Vong, and Chun Shun Cheung. "Modeling and optimization of biodiesel engine performance using kernel-based extreme learning machine and cuckoo search." *Renewable Energy* 74 (2015): 640-647.

Yuan, Yupeng, Meng Zhang, Yongzhi Chen, and Xiaobing Mao. "Multi-sliding surface control for the speed regulation system of ship diesel engines." *Transactions of the Institute of Measurement and Control* 40, no. 1 (2018): 22-34.

Zhang, Bin, E. Jiaqiang, Jinke Gong, Wenhua Yuan, Wei Zuo, Yu Li, and Jun Fu. "Multidisciplinary design optimization of the diesel particulate filter in the composite regeneration process." *Applied energy* 181 (2016): 14-28.

U.S. Patent and Published Patent Application Nos. 10007513; 10014812; 10034066; 10056008; 10075834; 10087065; 10089370; 10089610; 10091276; 10106237; 10111272; U.S. Pat. Nos. 3,951,626; 3,960,012; 3,960,060; 3,972,224; 3,974,802; 4,165,795; 4,212,066; 4,240,381; 4,286,324; 4,303,377; 4,307,450; 4,333,548; 4,341,984; 4,354,144; 4,364,265; 4,436,482; 4,469,055; 4,661,714; 4,742,681; 4,777,866; 4,796,592; 4,854,274; 4,858,569; 4,939,898; 4,994,188; 5,076,229; 5,097,814; 5,165,373; 5,195,469; 5,259,344; 5,266,009; 5,474,036; 5,520,161; 5,632,144; 5,658,176; 5,679,035; 5,788,004; 5,832,897; 6,092,021; 6,213,089; 6,295,970; 6,319,168; 6,325,047; 6,359,421; 6,390,059; 6,418,365; 6,427,659; 6,497,223; 6,512,983; 6,520,144; 6,564,546; 6,588,258; 6,641,365; 6,732,706; 6,752,733; 6,804,997; 6,955,081; 6,973,792; 6,990,855; 7,013,863; 7,121,253; 7,143,580; 7,225,793; 7,325,532; 7,392,129; 7,460,958; 7,488,357; 7,542,842; 8,155,868; 8,196,686; 8,291,587; 8,384,397; 8,418,462; 8,442,729; 8,514,061; 8,534,401; 8,539,764; 8,608,620; 8,640,437; 8,955,474; 8,996,290; 9,260,838; 9,267,454; 9,371,629; 9,399,185; 9,424,521; 9,441,532; 9,512,794; 9,574,492; 9,586,805; 9,592,964; 9,637,111; 9,638,537; 9,674,880; 9,711,050; 9,764,732; 9,775,562; 9,790,080; 9,792,259; 9,792,575; 9,815,683; 9,819,296; 9,836,056; 9,882,987; 9,889,840; 9,904,264; 9,904,900; 9,906,381; 9,923,124; 9,932,220; 9,932,925; 9,946,262; 9,981,840; 9,984,134; 9,992,701; 20010015194; 20010032617; 20020055815; 20020144671; 20030139248; 20040011325; 20040134268; 20040155468; 20040159721; 20050039526; 20050169743; 20060086089; 20060107586; 20060118079; 20060118086; 20060155486; 20070073467; 20070142997; 20080034720; 20080047272; 20080306636; 20080306674; 20090017987; 20090320461; 20100018479; 20100018480; 20100101409; 20100138118; 20100206721; 20100313418; 20110088386; 20110148614; 20110282561; 20110283695; 20120022734; 20120191280; 20120221227; 20130125745; 20130151115; 20130160744; 20140007574; 20140039768; 20140041626; 20140165561; 20140290595; 20140336905; 20150046060; 20150169714; 20150233279; 20150293981; 20150339586; 20160016525; 20160107650; 20160108805; 20160117785; 20160159339; 20160159364; 20160160786; 20160196527; 20160201586; 20160216130; 20160217381; 20160269436; 20160288782; 20160334767; 20160337198; 20160337441; 20160349330; 20160357187; 20160357188; 20160357262; 20160358084; 20160358477; 20160362096; 20160364678; 20160364679; 20160364812; 20160364823; 20170018688; 20170022015; 20170034644; 20170037790; 20170046669; 20170051689; 20170060567; 20170060574; 20170142204; 20170151928; 20170159556; 20170176958; 20170177546; 20170184315; 20170185956; 20170198458; 20170200324; 20170208540; 20170211453; 20170214760; 20170234691; 20170238346; 20170260920; 20170262790; 20170262820; 20170269599; 20170272972; 20170279957; 20170286572; 20170287335; 20170318360; 20170323249; 20170328679; 20170328680; 20170328681; 20170328682; 20170328683; 20170344620; 20180005178; 20180017405; 20180020477; 20180023489; 20180025408; 20180025430; 20180032836; 20180038703; 20180047107; 20180054376; 20180073459; 20180075380; 20180091506; 20180095470; 20180097883; 20180099855; 20180099858; 20180099862; 20180099863; 20180099864; 20180101183; 20180101184; 20180108023; 20180108942; 20180121903; 20180122234; 20180122237; 20180137219; 20180158020; 20180171592; 20180176329; 20180176663; 20180176664; 20180183661; 20180188704; 20180188714; 20180188715; 20180189332; 20180189344; 20180189717; 20180195254; 20180197418; 20180202379; 20180210425; 20180210426; 20180210427; 20180215380; 20180218452; 20180229998; 20180230919; 20180253073; 20180253074; 20180253075; 20180255374; 20180255375; 20180255376; 20180255377; 20180255378; 20180255379; 20180255380; 20180255381; 20180255382; 20180255383; 20180262574; 20180270121; 20180274927; 20180279032; 20180284735; 20180284736; 20180284737; 20180284741; 20180284742; 20180284743; 20180284744; 20180284745; 20180284746; 20180284747; 20180284749; 20180284752; 20180284753; 20180284754; 20180284755; 20180284756; 20180284757; 20180284758; 20180288586; 20180288641; 20180290877; 20180293816; 20180299878; 20180300124; and 20180308371.

BRIEF DESCRIPTION OF THE DRAWINGS

FIGS. 12*a*-12*e* show examples of graphical user interfaces (GUIs) for prediction, planning, and optimization of trip time, cost, or fuel emissions, in accordance with some embodiments of the presently disclosed technology.

DETAILED DESCRIPTION

Figure 1:
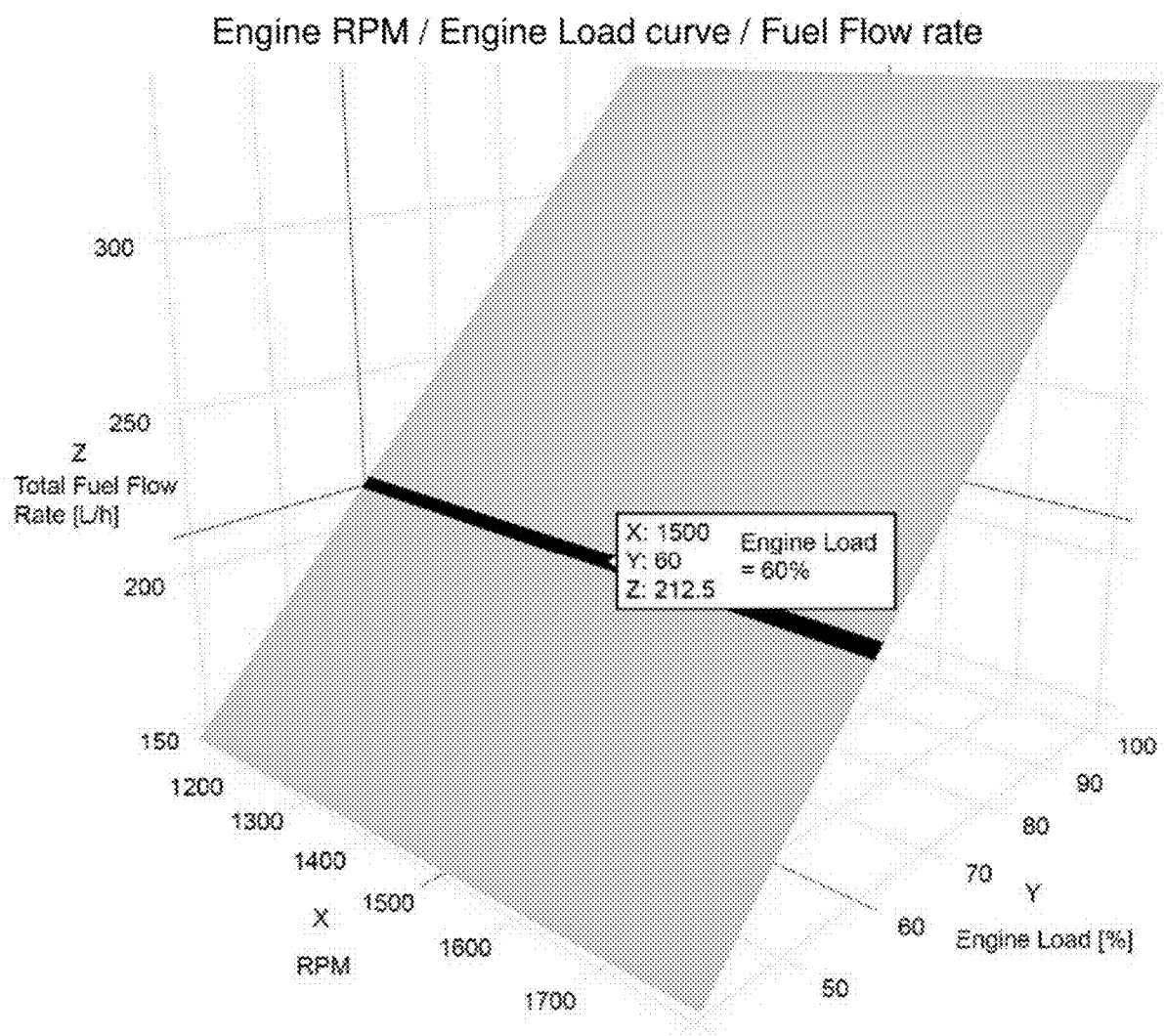
FIG. 1 shows a graph of engine RPM, engine load curve, and fuel flow rate for a regular cruising operation.

In order to predict, in real-time or near real-time (e.g., within 30, 10, 5, 1, 0.5, or 0.1 second(s)), the relationship between a vehicle's engine speed (rotations per minute, RPM) and its trip time and trip cost, a statistical model may be created to predict these complex relationships. The statistical model may also include geographic features and constraints, traffic and risk of delay, geopolitical risks, and the like. This is particularly useful for marine vessels.

Using some embodiments of the model and the methods and algorithms described herein, trip time and trip cost can be computed from predicted average vehicle speed and predicted average fuel flow rate, e.g., for every minute of a trip, for a known trip distance.

In a variance analysis of diesel engine data, engine fuel rate and vessel speed were found to have strong correlation with engine revolutions per minute (RPM) and engine load percentage (e.g., as represented by a "fuel index") in a bounded range of engine RPM and when the engine was in steady state, i.e., engine RPM and engine load were stable.

Considering constant external factors (e.g., wind, current, ocean conditions, etc.) and for a given state of the vessel and engine inside a bounded region of engine RPM (e.g., above idle engine RPM), a function $f1$ exists such that:

$$\text{fuel rate} = f1(\text{RPM, load})$$

where $f1: \mathbb{R}^n \to \mathbb{R}^m$. In this case, n equals two (RPM and load) and m equals one (fuel rate). In other words, $f1$ is a map that allows for prediction of a single dependent variable from two independent variables. Similarly, a function $f2$ exists such that:

$$\text{vessel speed} = f2(\text{RPM, load})$$

where $f2: \mathbb{R}^n \to \mathbb{R}^m$. In this case n equals two (RPM and load) and m equals one (vessel speed).

Grouping these two maps into one map leads to a multi-dimensional map (i.e., the model) such that $f: \mathbb{R}^n \to \mathbb{R}^m$ where n equals two (RPM, load) and m equals two (fuel rate and vessel speed). Critically, many maps are grouped into a single map with the same input variables, enabling potentially many correlated variables (i.e., a tensor of variables) to be predicted within a bounded range. Note that the specific independent variables need not be engine RPM and engine load and need not be limited to two variables. For example, engine operating hours can be added as an independent variable in the map to account for engine degradation with operating time.

Vessel speed is also affected by factors in addition to engine RPM and engine load, such as: water speed and/or direction, wind speed and/or direction, propeller pitch, weight and drag of a towed load, weight of on-board fuel, marine growth on the vessel's hull, etc. Many of these factors are impractical or expensive to measure in real-time. Their effects are not known as mathematical functions, and so a direct measurement of those external variables is not necessarily effective for real-time prediction of speed, fuel usage, and/or emissions estimates at different RPMs and/or engine loads.

In some embodiments, an edge computing device is installed on a vessel that interfaces with all the diesel engines' electronic control units/modules (ECUs/ECMs) and collects engine sensor data as a time series (e.g., all engines' RPMs, load percentages, fuel rates, etc.) as well as vessel speed and location data from an internal GPS/DGPS or vessel's GPS/DGPS. For example, the edge device collects all of these sensor data at an approximate rate of sixty samples per minute and align the data to every second's time-stamp (e.g., 12:00:00, 12:00:01, 12:00:02, . . . ). If data can be recorded at higher frequency, the average may be calculated for each second. Then the average value (i.e., arithmetical mean) for each minute is calculated, creating the minute's averaged time series (e.g., 12:00:00, 12:01:00, 12:02:00, . . . ). Minute's average data were found to be more stable for developing statistical models and predicting anomalies than raw, high-frequency samples. In some embodiments, data smoothing methods other than per-minute averaging are used.

For vessels with multiple engines, the model may assume that all engines are operating at the same RPM with small variations and that the average of all engine RPM is used as the RPM input to the model and, similarly, the average of all engines' loads are used as the load input to the model. Of course, this is not a limitation, and more complex models may be implemented. Some parameter inputs to the model may be a summation instead of an average. For example, the fuel rate parameter can be the sum of all engines' fuel rates as opposed to the average.

The present technology provides an on-demand and near real-time method for predicting trip time and trip cost at different engine RPM at the current engine load, while accounting for the effects of the previously described unknown factors (without necessarily including their direct measurement). The combined effect of the unknown factors may be assumed to remain constant for varying vessel speeds at the given point in space and time. On the other hand, where sufficient data are available, more complex estimators may be employed for the unknown factors.

A point in space is defined as a latitude and longitude for marine vessels, though it may include elevation for airplanes. The model may continuously or periodically update the predicted relationship between input engine parameters and the resulting trip cost, time, and emissions as operating conditions (e.g., vessel load, water and weather conditions, etc.) change over time. These predictions can be coupled with trip distance information and dependent parameter constrains (e.g., cost, time, and/or emissions limits) to predict a range of engine RPM (or load or fuel index) over which those constraints are satisfied over the course of a trip. Such predictions allow vessel operators to make informed decisions and minimize fuel usage, overall costs, and/or emissions.

For example, in cases where trip time is the priority, such predictions allow a vessel to reach its destination on time, but with minimal fuel usage. When voyage duration is less important, such as when waiting for inclement weather, fuel usage can be minimized while maintaining a safe vessel operating speed.

A general explanation of the model is as follows: models that characterize the relationships between engine RPM, engine load, and engine fuel flow rate as well as engine RPM, engine load, and vessel speed are created using machine learning on training data collected in an environment where the effects of non-engine factors are minimized or may be minimized algorithmically. In some embodiments, the programming language 'It' is used as an environment for statistical computing, model generation, and graphics. In order to create a calibration curve, training data may be collected in the following manner: in an area with minimal environmental factors (e.g., a calm harbor), navigate a vessel between two points, A and B. While navigating from A to B, slowly and gradually increase engine RPM from idle to maximum RPM and gradually decrease from maximum RPM to idle. Perform the same idle to maximum to idle RPM sweep when returning from point B to A. By averaging this training data, the contribution to vessel speed by any potential environmental factors can be further minimized from the training set. A mobile phone application or vessel-based user interface can help to validate that the required calibration data has been collected successfully. If this calibration curve were created just prior to a vessel's voyage, it would provide data that reflect the current operating conditions of the vessel (weight of on-board fuel and cargo or marine growth on the vessel's hull, for example) and can lead to more accurate predictions by the models in many cases. In other implementations, the model can be updated to include additional data points as the system collects data during a voyage. In addition, the model can be created using data collected from previous trips made by the vessel, which may prove useful in operating conditions where vessel cargo or vessel load fluctuate over a voyage.

During a voyage, near real-time engine RPM and engine load (from an ECM) and actual vessel speed (from a GPS) are logged by the edge device. Vessel speed and engine fuel flow rate are predicted using the generated statistical models. The difference between predicted vessel speed over ground and measured vessel speed over ground as determined by GPS or other devices is also computed in near real-time at the same time stamp.

In some embodiments, this difference (i.e., the error) between predicted and measured vessel speed is the summation of three error components: irreducible error, model bias error, and variance error.

Model bias error can be minimized using a low bias machine learning model (e.g., multivariate adaptive regression splines, Neural network, support vector machine (SVM), generalized additive model (GAM), etc.). GAM is further discussed below.

Thus for high error values (e.g., error values greater than 1 standard deviations from the mean error, which is near to zero) the majority of the error is expected to be made up of variance error, which is caused by the combined effects of all the unknown factors acting on the vessel and not accounted for in the model. The predicted vessel speeds are then corrected by adding the calculated error (i.e., the difference between the predicted and measured vessel speed) to the predicted speed at all RPM for the measured load. Note that the error may be negative.

With a model for the vessel speed at each RPM and the total trip distance, the expected trip time for each RPM can be calculated. Then, by multiplying the predicted trip time by the total fuel flow rate, the predicted total fuel usage for each RPM may be determined. Thus, models for RPM versus total trip time and RPM versus total trip fuel usage at the measured engine load may be generated. These two models can be grouped into a single model that will be referred to as the 'trip model'. This combined model is updated at near real-time and for each successive data point as the trip distance is updated and/or as the difference between the predicted and measured speed changes. Predictions from the trip model can be further constrained by a safe speed range, trip cost limit, trip time limit, and/or trip emissions, for example.

If the real-time water speed and current direction are available, and water speed in the direction of the vessel's motion can be calculated, then the component of water speed in the direction of the vessel's motion can be subtracted from the speed error and the model can be updated with that refined error. In that case, knowing the forecast water speeds (e.g., tide timing and speed) or wind speeds and directions ahead of time can be useful for trip optimization. In some embodiments of model generation, water current and wind speed and direction data can be included in the model to predict vessel speed.

Additionally, the problems and algorithms discussed herein are equally applicable to airplanes moving through varying wind streams with varying cargo loads. Thus the analysis of speed and trip cost based on a set of engine parameters need not be limited to marine vessels and may be applied to any vehicle or vessel as needed and as feasible.

Various predictive modeling methods are known, including Group method of data handling; Naïve Bayes; k-nearest neighbor algorithm; Majority classifier; Support vector machines; Random forests; Boosted trees; CART (Classification and Regression Trees); Multivariate adaptive regression splines (MARS); Neural Networks and deep neural networks; ACE and AVAS; Ordinary Least Squares; Generalized Linear Models (GLM) (The generalized linear model (GLM) is a flexible family of models that are unified under a single method. Logistic regression is a notable special case of GLM. Other types of GLM include Poisson regression, gamma regression, and multinomial regression); Logistic regression (Logistic regression is a technique in which unknown values of a discrete variable are predicted based on known values of one or more continuous and/or discrete variables. Logistic regression differs from ordinary least squares (OLS) regression in that the dependent variable is binary in nature. This procedure has many applications); Generalized additive models; Robust regression; and Semi-parametric regression.

Geisser, Seymour (September 2016). Predictive Inference: An Introduction. New York: Chapman & Hall. ISBN 0-412-03471-9.

Finlay, Steven (2014). Predictive Analytics, Data Mining and Big Data. Myths, Misconceptions and Methods (1st ed.). Basingstoke: Palgrave Macmillan. p. 237. ISBN 978-1137379276.

Sheskin, David J. (Apr. 27, 2011). Handbook of Parametric and Nonparametric Statistical Procedures. Boca Raton, Fla.: CRC Press. p. 109. ISBN 1439858012.

Marascuilo, Leonard A. (December 1977). Nonparametric and distribution-free methods for the social sciences. Brooks/Cole Publishing Co. ISBN 0818502029.

Wilcox, Rand R. (Mar. 18, 2010). Fundamentals of Modern Statistical Methods. New York: Springer. pp. 200-213. ISBN 1441955240.

Steyerberg, Ewout W. (Oct. 21, 2010). Clinical Prediction Models. New York: Springer. p. 313. ISBN 1441926488.

Breiman, Leo (August 1996). "Bagging predictors". Machine Learning. 24 (2): 123-140. doi:10.1007/bf00058655.

Willey, Gordon R. (1953) "Prehistoric Settlement Patterns in the Virú Valley, Peru", Bulletin 155. Bureau of American Ethnology Heidelberg, Kurt, et al. "An Evaluation of the Archaeological Sample Survey Program at the Nevada Test and Training Range", SRI Technical Report 02-16, 2002

Jeffrey H. Altschul, Lynne Sebastian, and Kurt Heidelberg, "Predictive Modeling in the Military: Similar Goals, Divergent Paths", Preservation Research Series 1, SRI Foundation, 2004 forteconsultancy.wordpress.com/2010/05/17/wondering-what-lies-ahead-the-power-of-predictive-modeling/

"Hospital Uses Data Analytics and Predictive Modeling To Identify and Allocate Scarce Resources to High-Risk Patients, Leading to Fewer Readmissions". Agency for Healthcare Research and Quality. 2014-01-29. Retrieved 2014-01-29.

Banerjee, Imon. "Probabilistic Prognostic Estimates of Survival in Metastatic Cancer Patients (PPES-Met) Utilizing Free-Text Clinical Narratives". Scientific Reports. 8 (10037 (2018)). doi:10.1038/s41598-018-27946-5.

"Implementing Predictive Modeling in R for Algorithmic Trading". 2016-10-07. Retrieved 2016-11-25.

"Predictive-Model Based Trading Systems, Part 1—System Trader Success". System Trader Success. 2013-07-22. Retrieved 2016-11-25.

In statistics, the generalized linear model (GLM) is a flexible generalization of ordinary linear regression that allows for response variables that have error distribution models other than a normal distribution. The GLM generalizes linear regression by allowing the linear model to be related to the response variable via a link function and by allowing the magnitude of the variance of each measurement to be a function of its predicted value. Generalized linear models unify various other statistical models, including linear regression, logistic regression and Poisson regression, and employs an iteratively reweighted least squares method for maximum likelihood estimation of the model parameters.

Ordinary linear regression predicts the expected value of a given unknown quantity (the response variable, a random variable) as a linear combination of a set of observed values (predictors). This implies that a constant change in a predictor leads to a constant change in the response variable (i.e., a linear-response model). This is appropriate when the response variable has a normal distribution (intuitively, when a response variable can vary essentially indefinitely in either direction with no fixed "zero value", or more generally for any quantity that only varies by a relatively small amount, e.g., human heights). However, these assumptions are inappropriate for some types of response variables. For example, in cases where the response variable is expected to be always positive and varying over a wide range, constant input changes lead to geometrically varying, rather than constantly varying, output changes.

In a generalized linear model (GLM), each outcome Y of the dependent variables is assumed to be generated from a particular distribution in the exponential family, a large range of probability distributions that includes the normal, binomial, Poisson and gamma distributions, among others.

The GLM consists of three elements: A probability distribution from the exponential family; a linear predictor $\eta = X\beta$; and a link function g such that $E(Y) = \mu = g-1(\eta)$. The linear predictor is the quantity which incorporates the information about the independent variables into the model. The symbol $\eta$ (Greek "eta") denotes a linear predictor. It is related to the expected value of the data through the link function. $\eta$ is expressed as linear combinations (thus, "linear") of unknown parameters $\beta$. The coefficients of the linear combination are represented as the matrix of independent variables X. $\eta$ can thus be expressed as The link function provides the relationship between the linear predictor and the mean of the distribution function. There are many commonly used link functions, and their choice is informed by several considerations. There is always a well-defined canonical link function which is derived from the exponential of the response's density function. However, in some cases it makes sense to try to match the domain of the link function to the range of the distribution function's mean, or use a non-canonical link function for algorithmic purposes, for example Bayesian probit regression. For the most common distributions, the mean is one of the parameters in the standard form of the distribution's density function, and then is the function as defined above that maps the density function into its canonical form. A simple, very important example of a generalized linear model (also an example of a general linear model) is linear regression. In linear regression, the use of the least-squares estimator is justified by the Gauss-Markov theorem, which does not assume that the distribution is normal.

The standard GLM assumes that the observations are uncorrelated. Extensions have been developed to allow for correlation between observations, as occurs for example in longitudinal studies and clustered designs. Generalized estimating equations (GEEs) allow for the correlation between observations without the use of an explicit probability model for the origin of the correlations, so there is no explicit likelihood. They are suitable when the random effects and their variances are not of inherent interest, as they allow for the correlation without explaining its origin. The focus is on estimating the average response over the population ("population-averaged" effects) rather than the regression parameters that would enable prediction of the effect of changing one or more components of X on a given individual. GEEs are usually used in conjunction with Huber-White standard errors. Generalized linear mixed models (GLMMs) are an extension to GLMs that includes random effects in the linear predictor, giving an explicit probability model that explains the origin of the correlations. The resulting "subject-specific" parameter estimates are suitable when the focus is on estimating the effect of changing one or more components of X on a given individual. GLMMs are also referred to as multilevel models and as mixed model. In general, fitting GLMMs is more computationally complex and intensive than fitting GEEs.

In statistics, a generalized additive model (GAM) is a generalized linear model in which the linear predictor depends linearly on unknown smooth functions of some predictor variables, and interest focuses on inference about these smooth functions. GAMs were originally developed by Trevor Hastie and Robert Tibshirani to blend properties of generalized linear models with additive models.

The model relates a univariate response variable, to some predictor variables. An exponential family distribution is specified for (for example normal, binomial or Poisson distributions) along with a link function g (for example the identity or log functions) relating the expected value of univariate response variable to the predictor variables.

The functions may have a specified parametric form (for example a polynomial, or an un-penalized regression spline of a variable) or may be specified non-parametrically, or semi-parametrically, simply as 'smooth functions', to be estimated by non-parametric means. So a typical GAM might use a scatterplot smoothing function, such as a locally weighted mean. This flexibility to allow non-parametric fits with relaxed assumptions on the actual relationship between response and predictor, provides the potential for better fits to data than purely parametric models, but arguably with some loss of interpretability.

Any multivariate function can be represented as sums and compositions of univariate functions. Unfortunately, though the Kolmogorov-Arnold representation theorem asserts the existence of a function of this form, it gives no mechanism whereby one could be constructed. Certain constructive proofs exist, but they tend to require highly complicated (i.e., fractal) functions, and thus are not suitable for modeling approaches. It is not clear that any step-wise (i.e., backfitting algorithm) approach could even approximate a solution. Therefore, the Generalized Additive Model drops the outer sum, and demands instead that the function belong to a simpler class.

The original GAM fitting method estimated the smooth components of the model using non-parametric smoothers (for example smoothing splines or local linear regression smoothers) via the backfitting algorithm. Backfitting works by iterative smoothing of partial residuals and provides a very general modular estimation method capable of using a wide variety of smoothing methods to estimate the terms. Many modern implementations of GAMs and their extensions are built around the reduced rank smoothing approach, because it allows well founded estimation of the smoothness of the component smooths at comparatively modest computational cost, and also facilitates implementation of a number of model extensions in a way that is more difficult with other methods. At its simplest the idea is to replace the unknown smooth functions in the model with basis expansions. Smoothing bias complicates interval estimation for these models, and the simplest approach turns out to involve a Bayesian approach. Understanding this Bayesian view of smoothing also helps to understand the REML and full Bayes approaches to smoothing parameter estimation. At some level smoothing penalties are imposed.

Overfitting can be a problem with GAMs, especially if there is un-modelled residual auto-correlation or un-modelled overdispersion. Cross-validation can be used to detect and/or reduce overfitting problems with GAMs (or other statistical methods), and software often allows the level of penalization to be increased to force smoother fits. Estimating very large numbers of smoothing parameters is also likely to be statistically challenging, and there are known tendencies for prediction error criteria (GCV, AIC, etc.) to occasionally undersmooth substantially, particularly at moderate sample sizes, with REML being somewhat less problematic in this regard. Where appropriate, simpler models such as GLMs may be preferable to GAMs unless GAMs improve predictive ability substantially (in validation sets) for the application in question.

Augustin, N. H.; Sauleau, E-A; Wood, S. N. (2012). "On quantile quantile plots for generalized linear models". Computational Statistics and Data Analysis. 56: 2404-2409. doi:10.1016/j.csda.2012.01.026.

Brian Junker (Mar. 22, 2010). "Additive models and cross-validation".

Chambers, J. M.; Hastie, T. (1993). Statistical Models in S. Chapman and Hall.

Dobson, A. J.; Barnett, A. G. (2008). Introduction to Generalized Linear Models (3rd ed.). Boca Raton, Fla.: Chapman and Hall/CRC. ISBN 1-58488-165-8.

Fahrmeier, L.; Lang, S. (2001). "Bayesian Inference for Generalized Additive Mixed Models based on Markov Random Field Priors". Journal of the Royal Statistical Society, Series C. 50: 201-220.

Greven, Sonja; Kneib, Thomas (2010). "On the behaviour of marginal and conditional AIC in linear mixed models". Biometrika. 97: 773-789. doi:10.1093/biomet/asq042.

Gu, C.; Wahba, G. (1991). "Minimizing GCV/GML scores with multiple smoothing parameters via the Newton method". SIAM Journal on Scientific and Statistical Computing. 12. pp. 383-398.

Gu, Chong (2013). Smoothing Spline ANOVA Models (2nd ed.). Springer.

Hardin, James; Hilbe, Joseph (2003). Generalized Estimating Equations. London: Chapman and Hall/CRC. ISBN 1-58488-307-3.

Hardin, James; Hilbe, Joseph (2007). Generalized Linear Models and Extensions (2nd ed.). College Station: Stata Press. ISBN 1-59718-014-9.

Hastie, T. J.; Tibshirani, R. J. (1990). Generalized Additive Models. Chapman & Hall/CRC. ISBN 978-0-412-34390-2.

Kim, Y. J.; Gu, C. (2004). "Smoothing spline Gaussian regression: more scalable computation via efficient approximation". Journal of the Royal Statistical Society, Series B. 66. pp. 337-356.

Madsen, Henrik; Thyregod, Poul (2011). Introduction to General and Generalized Linear Models. Chapman & Hall/CRC. ISBN 978-1-4200-9155-7.

Marra, G.; Wood, S. N. (2011). "Practical Variable Selection for Generalized Additive Models". Computational Statistics and Data Analysis. 55: 2372-2387. doi:10.1016/j.csda.2011.02.004.

Marra, G.; Wood, S. N. (2012). "Coverage properties of confidence intervals for generalized additive model components". Scandinavian Journal of Statistics. 39: 53-74. doi:10.1111/j.1467-9469.2011.00760.x.

Mayr, A.; Fenske, N.; Hofner, B.; Kneib, T.; Schmid, M. (2012). "Generalized additive models for location, scale and shape for high dimensional data—a flexible approach based on boosting". Journal of the Royal Statistical Society, Series C. 61: 403-427. doi:10.1111/j.1467-9876.2011.01033.x.

McCullagh, Peter; Nelder, John (1989). Generalized Linear Models, Second Edition. Boca Raton: Chapman and Hall/CRC. ISBN 0-412-31760-5.

Nelder, John; Wedderburn, Robert (1972). "Generalized Linear Models". Journal of the Royal Statistical Society. Series A (General). Blackwell Publishing. 135 (3): 370-384. doi:10.2307/2344614. JSTOR 2344614.

Nychka, D. (1988). "Bayesian confidence intervals for smoothing splines". Journal of the American Statistical Association. 83. pp. 1134-1143.

Reiss, P. T.; Ogden, T. R. (2009). "Smoothing parameter selection for a class of semiparametric linear models". Journal of the Royal Statistical Society, Series B. 71: 505-523. doi:10.1111/j.1467-9868.2008.00695.x.

Rigby, R. A.; Stasinopoulos, D. M. (2005). "Generalized additive models for location, scale and shape (with discussion)". Journal of the Royal Statistical Society, Series C. 54: 507-554. doi:10.1111/j.1467-9876.2005.00510.x.

Rue, H.; Martino, Sara; Chopin, Nicolas (2009). "Approximate Bayesian inference for latent Gaussian models by using integrated nested Laplace approximations (with discussion)". Journal of the Royal Statistical Society, Series B. 71: 319-392. doi:10.1111/j.1467-9868.2008.00700.x.

Ruppert, D.; Wand, M. P.; Carroll, R. J. (2003). Semiparametric Regression. Cambridge University Press.

Schmid, M.; Hothorn, T. (2008). "Boosting additive models using component-wise P-splines". Computational Statistics and Data Analysis. 53: 298-311. doi:10.1016/j.csda.2008.09.009.

Senn, Stephen (2003). "A conversation with John Nelder". Statistical Science. 18 (1): 118-131. doi:10.1214/ss/1056397489.

Silverman, B. W. (1985). "Some Aspects of the Spline Smoothing Approach to Non-Parametric Regression Curve Fitting (with discussion)". Journal of the Royal Statistical Society, Series B. 47. pp. 1-53.

Umlauf, Nikolaus; Adler, Daniel; Kneib, Thomas; Lang, Stefan; Zeileis, Achim. "Structured Additive Regression Models: An R Interface to BayesX". Journal of Statistical Software. 63 (21): 1-46.

Wahba, G. (1983). "Bayesian Confidence Intervals for the Cross Validated Smoothing Spline". Journal of the Royal Statistical Society, Series B. 45. pp. 133-150.

Wahba, Grace. Spline Models for Observational Data. SIAM Rev., 33(3), 502-502 (1991).

Wood, S. N. (2000). "Modelling and smoothing parameter estimation with multiple quadratic penalties". Journal of the Royal Statistical Society. Series B. 62 (2): 413-428. doi:10.1111/1467-9868.00240.

Wood, S. N. (2017). Generalized Additive Models: An Introduction with R (2nd ed). Chapman & Hall/CRC. ISBN 978-1-58488-474-3.

Wood, S. N.; Pya, N.; Saefken, B. (2016). "Smoothing parameter and model selection for general smooth models (with discussion)". Journal of the American Statistical Association. 111: 1548-1575. doi:10.1080/01621459.2016.1180986.

Wood, S. N. (2011). "Fast stable restricted maximum likelihood and marginal likelihood estimation of semiparametric generalized linear models". Journal of the Royal Statistical Society, Series B. 73: 3-36.

Wood, Simon (2006). Generalized Additive Models: An Introduction with R. Chapman & Hall/CRC. ISBN 1-58488-474-6.

Wood, Simon N. (2008). "Fast stable direct fitting and smoothness selection for generalized additive models". Journal of the Royal Statistical Society, Series B. 70 (3): 495-518. arXiv:0709.3906. doi:10.1111/j.1467-9868.2007.00646.x.

Yee, Thomas (2015). Vector generalized linear and additive models. Springer. ISBN 978-1-4939-2817-0.

Zeger, Scott L.; Liang, Kung-Yee; Albert, Paul S. (1988). "Models for Longitudinal Data: A Generalized Estimating Equation Approach". Biometrics. International Biometric Society. 44 (4): 1049-1060. doi:10.2307/2531734. JSTOR 2531734. PMID 3233245.

It is therefore an object to provide a method for producing a real-time output based on at least one constraint and a relationship between a vehicle's engine speed, vehicle speed, fuel consumption rate, and indirectly measured operating conditions, comprising: monitoring vehicle speed and fuel consumption rate of the vehicle over an engine speed range of at least one engine of the vehicle; generating a predictive model relating the vehicle's engine speed, vehicle speed, and fuel consumption rate, based on the monitoring; and receiving at least one constraint on at least one of a trip time, trip fuel consumption, vehicle speed, fuel consumption rate, and estimated pollutant emissions; and automatically producing from at least one automated processor, based on the predictive model, and the received at least one constraint, an output constraint, e.g., real-time output comprising a constraint on vehicle operation.

It is also an object to provide a vehicle control system, comprising: a monitor for determining at least a vehicle speed and a fuel consumption rate of the vehicle over an engine speed range of at least one engine of the vehicle; a predictive model relating the vehicle's engine speed, vehicle speed, fuel consumption rate, operating cost, and pollution emissions, generated based on the monitoring; and at least one automated processor configured to automatically produce, based on the predictive model, an output constraint, e.g., a proposed engine speed dependent at least one constraint representing at least one of a trip time, trip fuel consumption, vehicle speed, fuel consumption rate, and estimated emissions.

It is a further object to provide a control system for a vehicle, comprising: a first input configured to receive information for monitoring at least a vehicle speed and a fuel consumption rate of the vehicle over an engine speed range of at least one engine of the vehicle; a second input configured to receive at least one constraint on at least one of a trip time, trip fuel consumption, vehicle speed, fuel consumption rate, and estimated emissions; a predictive model relating the vehicle's engine speed, vehicle speed, and fuel consumption rate, generated based on the monitoring; and at least one automated processor configured to automatically produce, based on the predictive model, and the received at least one constraint, an output constraint, e.g., an engine speed constraint.

The method may further comprise: monitoring the engine speed during said monitoring, and generating the predictive model further based on the monitored engine speed; monitoring the engine load percentage during said monitoring, and generating the predictive model further based on the monitored engine load; monitoring at least one of wind and water current speed along an axis of motion of the vehicle during said monitoring, and generating the predictive model further based on the monitoring of at least one of present-time or forecast wind and water current velocity vectors; and/or monitoring a propeller pitch during said monitoring, and generating the predictive model further based on the monitored propeller pitch.

The method may further comprise determining a failure of the predictive model; regenerating the predictive model based on newly-acquired data; annotating monitored vehicle speed and fuel consumption rate of the vehicle based on vehicle operating conditions; adaptively updating the predictive model; determining an error between predicted fuel flow rate and actual fuel flow rate; filtering data representing the vehicle's engine speed, vehicle speed, and fuel consumption rate for anomalies before generating the predictive model; and/or tagging data representing the vehicle's engine speed, vehicle speed, and fuel consumption rate with context information.

The predictive model may comprise a generalized additive model, a neural network, and/or a support vector machine, for example.

The received constraint may comprise a trip time, a trip fuel consumption, a vehicle speed, a fuel consumption rate, an estimate of emissions, a cost optimization, and/or an economic optimization of at least fuel cost and time cost.

The predictive model may model a fuel consumption with respect to engine speed and load.

The output constraint may be adaptive with respect to an external condition and/or location.

The vehicle may be a marine vessel, railroad locomotive, automobile, aircraft, or unmanned aerial vehicle, for example.

The control system may further comprise an output configured to control an engine of the vehicle according to the engine speed constraint.

The at least one automated processor may be further configured to generate the predictive model.

The engine speed may be monitored during said monitoring, and the predictive model further generated based on the monitored engine speed.

The engine load percentage may be monitored during said monitoring, and the predictive model may be further generated based on the monitored engine load.

The control system may further comprise an input configured to receive at least one of wind and water current speed along an axis of motion of the vehicle, and the predictive model further generated based on the monitored wind and water current speed along an axis of motion of the vehicle.

The control system may further comprise another input configured to monitor a propeller pitch during said monitoring, and the predictive model is further generated based on the monitored propeller pitch.

The automated processor may be further configured to do at least one of: determine a failure of the predictive model; regenerate the predictive model based on newly-acquired data; annotate monitored vehicle speed and fuel consumption rate of the vehicle based on vehicle operating conditions; adaptively update the predictive model; determine an error between predicted fuel flow rate and actual fuel flow rate; and filter data representing the vehicle's engine speed, vehicle speed, and fuel consumption rate for anomalies before the predictive model is generated.

The predictive model may be formulated using data representing the vehicle's engine speed, vehicle speed, and fuel consumption rate tagged with context information. The predictive model may comprise a generalized additive model, a neural network, and/or a support vector machine.

The received constraint may comprise at least one of a trip time, a trip fuel consumption, a vehicle speed, a fuel consumption rate, an estimate of emissions, a cost optimization, an economic optimization of at least fuel cost and time cost, and a fuel consumption with respect to engine speed.

The output constraint may be adaptive with respect to an external condition and/or location.

The vehicle may be a marine vessel, a railroad locomotive, an automobile, an aircraft, or an unmanned aerial vehicle.

The output constraint may comprise a real-time output comprising a constraint on vehicle operation; an engine speed constraint; a propeller pitch constraint; a combination of engine speed and propeller pitch; and/or a combination of monitored inputs.

One application for this technology is the use of the system to predict vessel planing speed for vessels with planing hull for different loads and conditions. Boats with planing hulls are designed to rise up and glide on top of the water when enough power is supplied, which is the most fuel efficient operating mode. These boats may operate like displacement hulls when at rest or at slow speeds but climb towards the surface of the water as they move faster.

Another application would be to provide fuel savings, by automatically sending control inputs to a smart governor module or device, to set optimum RPM for the trip considering trip constraints. Trip constraints can be a combination of trip time, trip cost, trip emission, minimal trip emissions at particular geospatial regions, etc.

Figure 2:
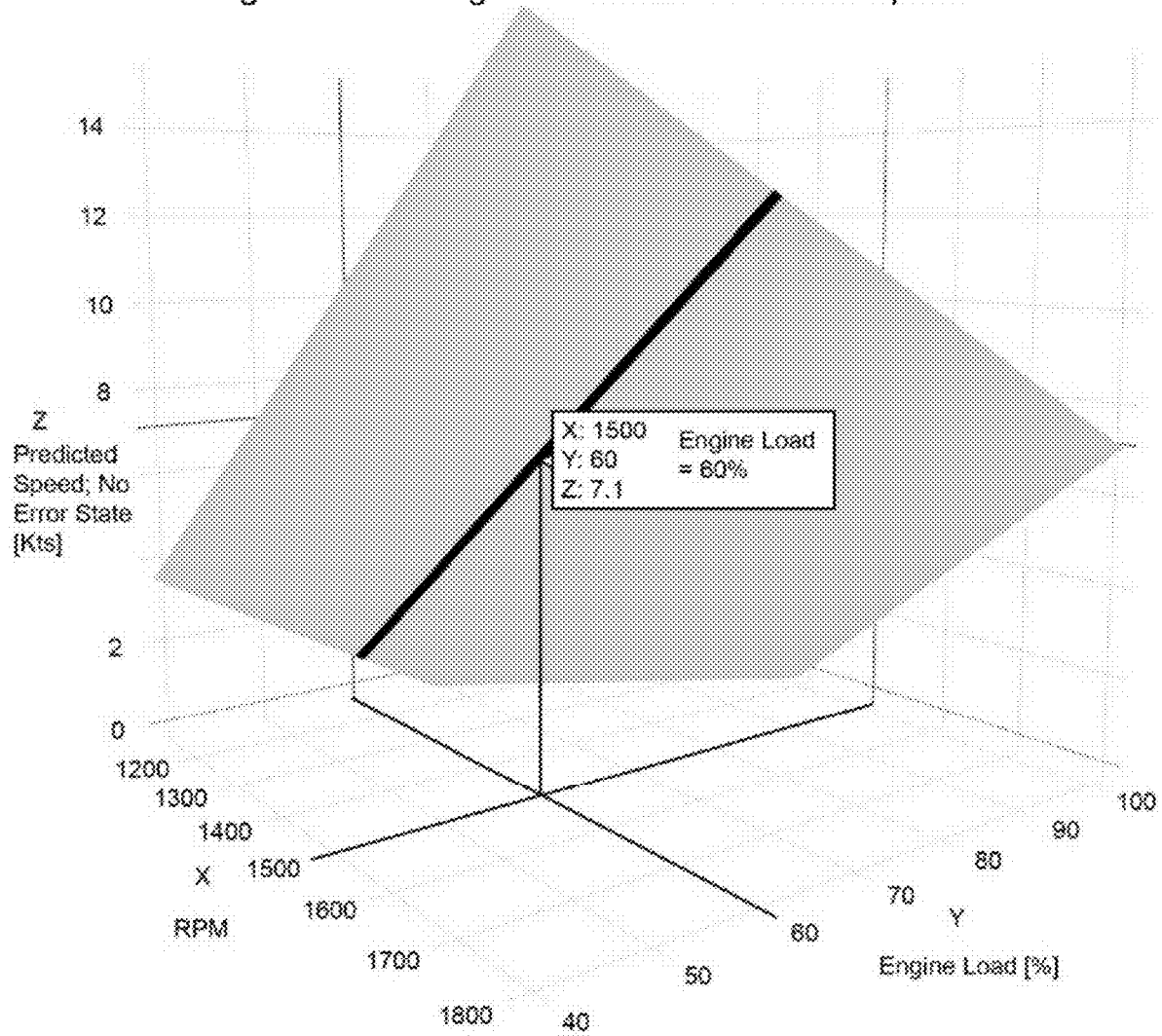
FIG. 2 shows a graph of engine RPM, engine load curve, and vessel speed for a regular cruising operation
Figure 3:
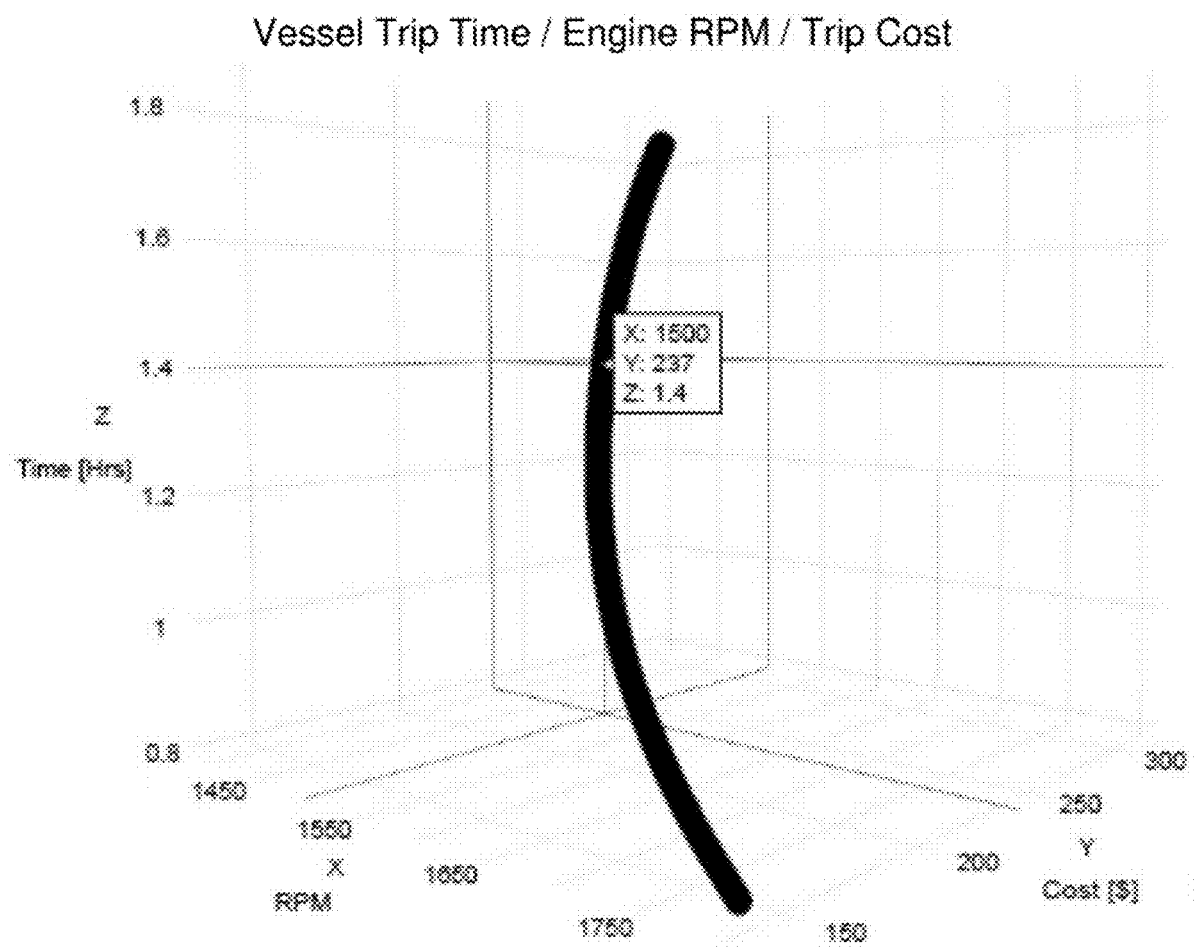
FIG. 3 shows a graph of vessel trip time, engine RPM, and trip cost for a regular cruising operation.
Figure 4:
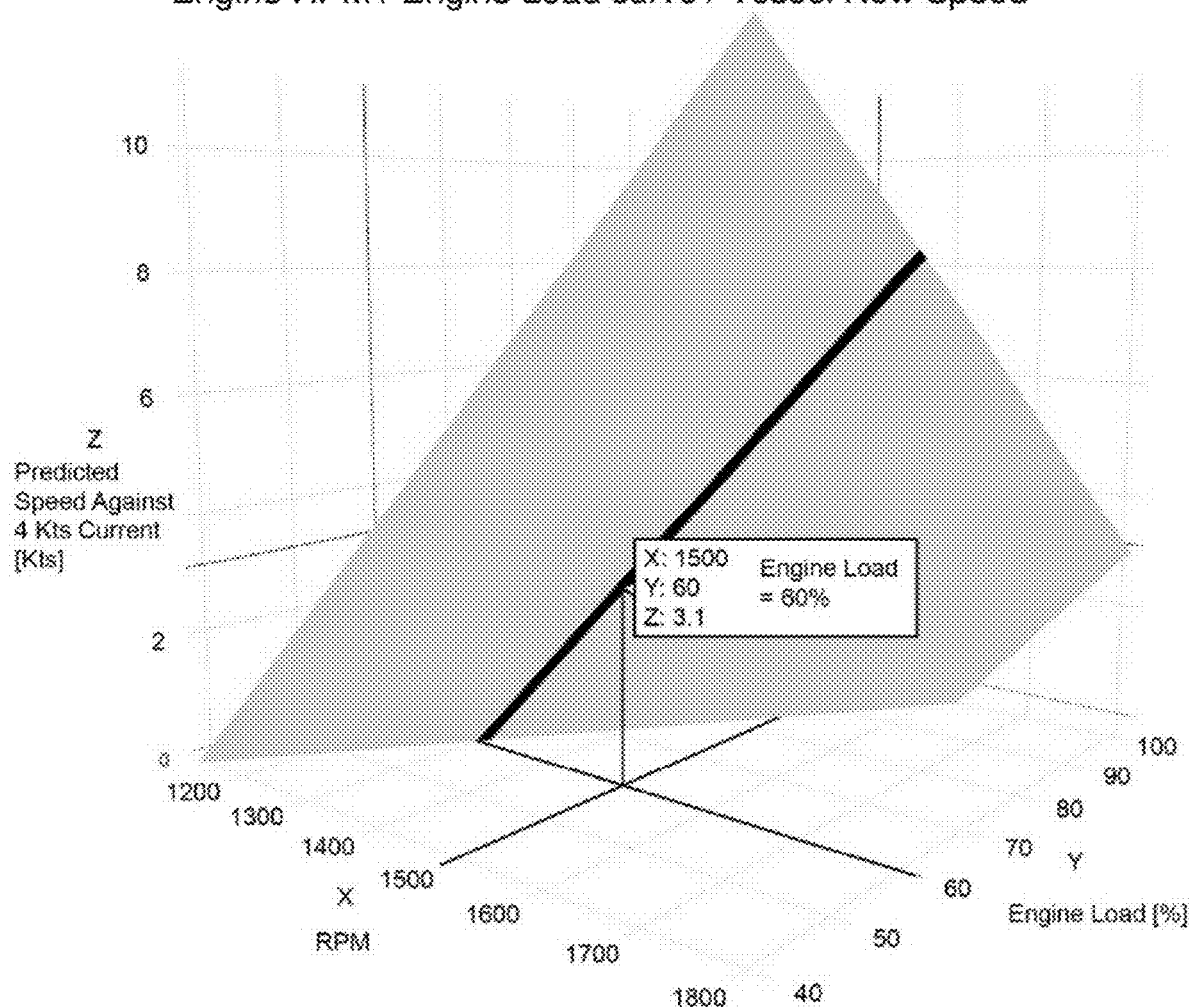
FIG. 4 shows a graph of engine RPM, engine load curve, and new vessel speed, for a fish trawling operation.
Figure 5:
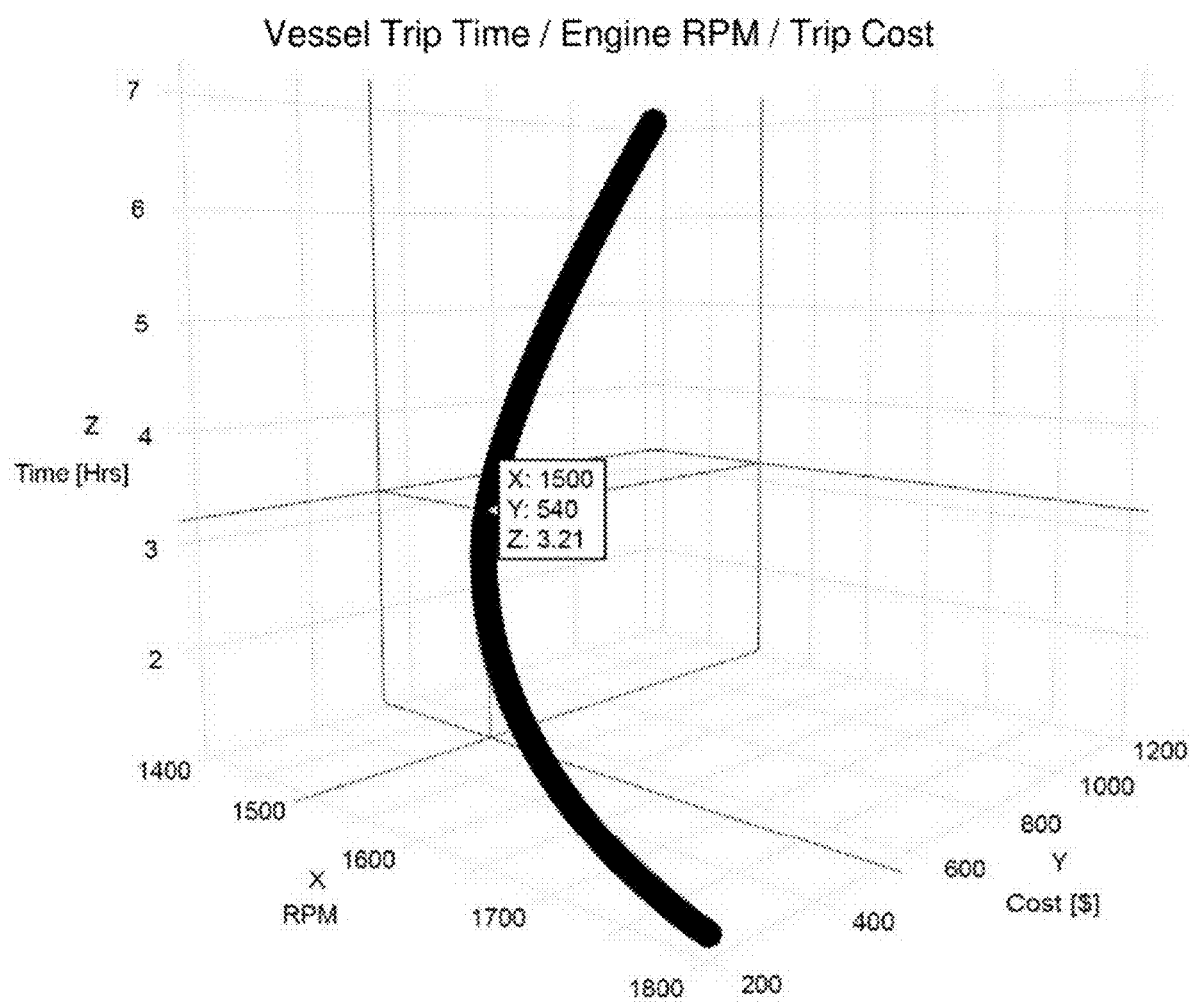
FIG. 5 shows a graph of vessel trip time, engine RPM, and trip cost for a fish trawling operation.

In accordance with some embodiments, a machine learning (ML) generated model's fuel flow rate prediction and vessel speed prediction considering no error in measured speed at no error/drag are shown in FIG. 1 and FIG. 2 respectively. At 1500 RPM, the boat travels 10 nautical miles in 1.4 hours and fuel cost is $237 considering fuel is $3 per gallon (FIG. 3). FIG. 4 shows the same model output considering 4 nautical miles/hour of drag due to trawling a fishing net. At the same 1500 RPM engine speed, the boat travels 10 miles in 3.21 hour and fuel cost is $540, considering fuel is $3 per gallon (FIG. 5). Note fuel flow/RPM/Load relationship does not change with the drag force.

With a known model for RPM and fuel usage, an RPM-to-emissions model may be generated and used to predict emissions over the course of a trip. Since measured or predicted fuel flow rate is available, the emissions estimation procedure recommended by the United States Environmental Protection Agency may be used and is recreated herein. See, www3.epa.gov/ttnchief/conference/ei19/session10/trozzi.pdf. The total trip emissions, $E_{trip}$, are the sum of the emissions during the three phases of a trip:

$$E_{trip} = E_{hotelling} + E_{maneuvering} + E_{crusing}$$

where hoteling is time spent at dock or in port, maneuvering is time spent approaching a harbor, and cruising is time spent traveling in open water. These phases may be determined by port coordinates, "geo-fencing", human input, and/or additional programmatic approaches. For each phase of the trip and each pollutant, the $E_{trip}$, is $$E_{trip,i,j,m} = \sum_{p} (FC_{j,m,p} \times EF_{i,j,m,p})$$

where
$E_{trip}$=total trip emissions [tons]
FC=fuel consumption [tons]
EF=emission factor [kg/ton]
i=pollutant
j=engine type [slow, medium, high-speed diesel, gas turbine, steam turbine]
m=fuel type [bunker fuel oil, marine diesel, gasoline]
p=trip phase [hoteling, maneuvering, cruising]

Figure 6:
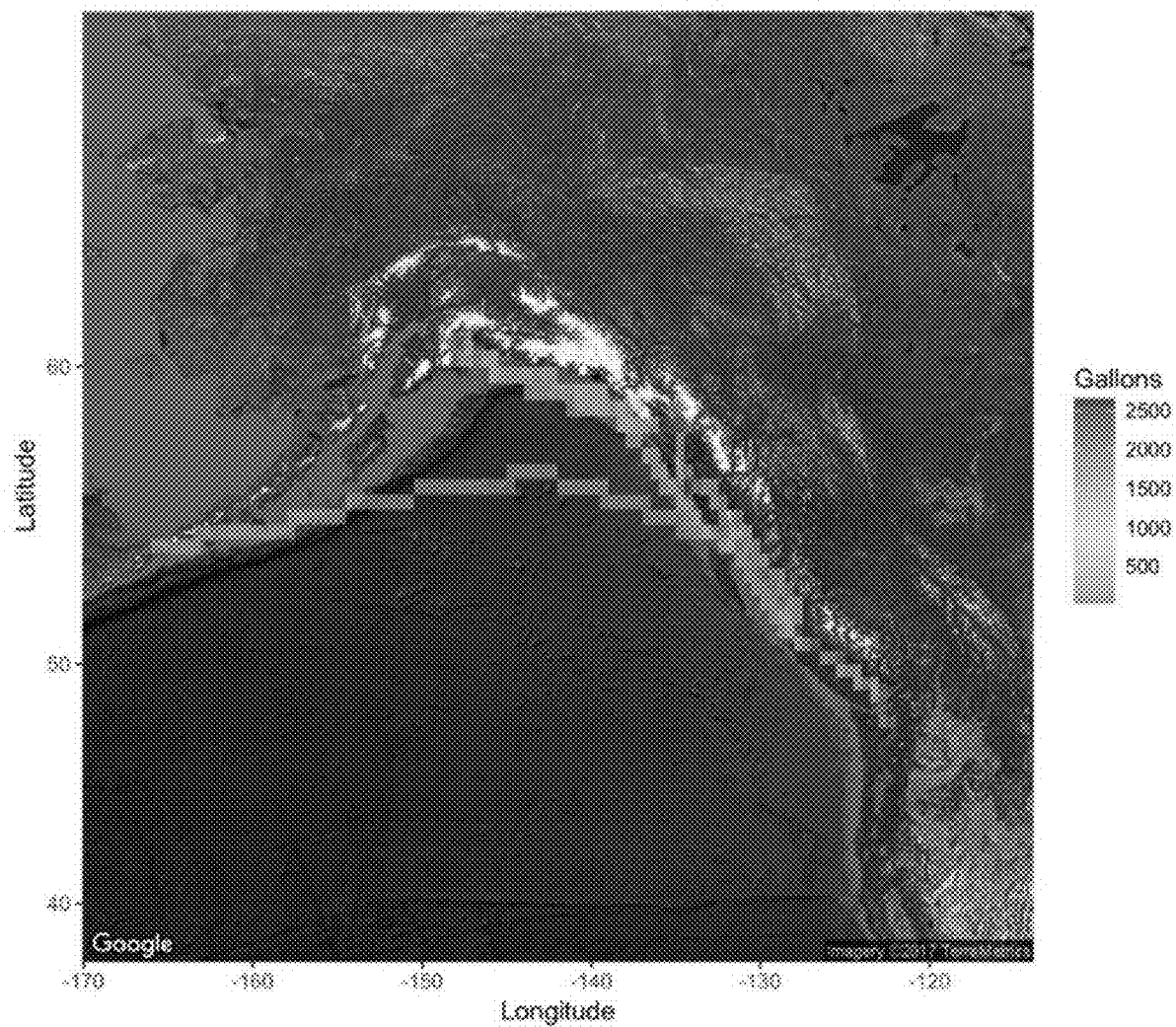
FIG. 6 shows fleet fuel usage per six months.
Figure 7:
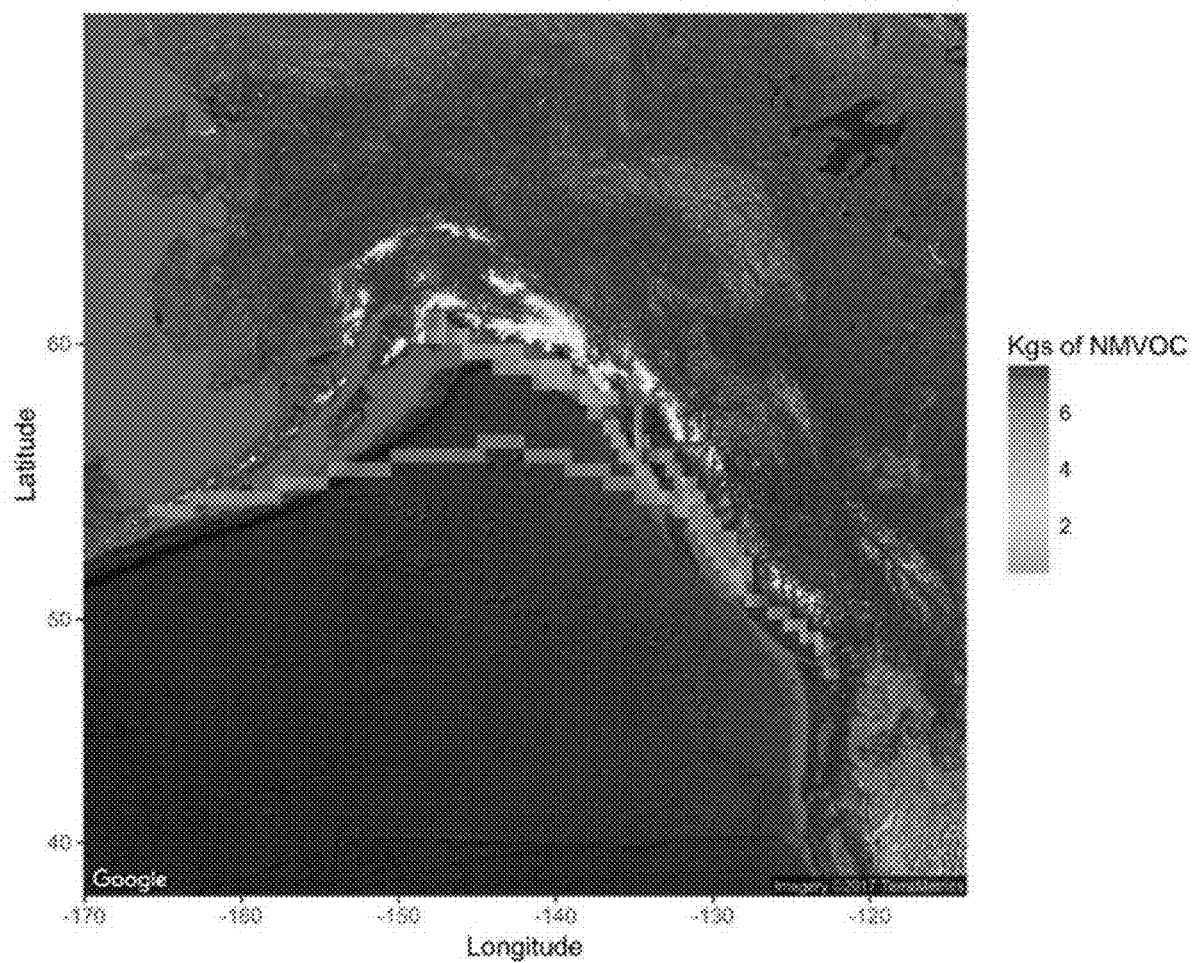
FIG. 7 shows fleet non-methane volatile organic compounds per six months.
Figure 8:
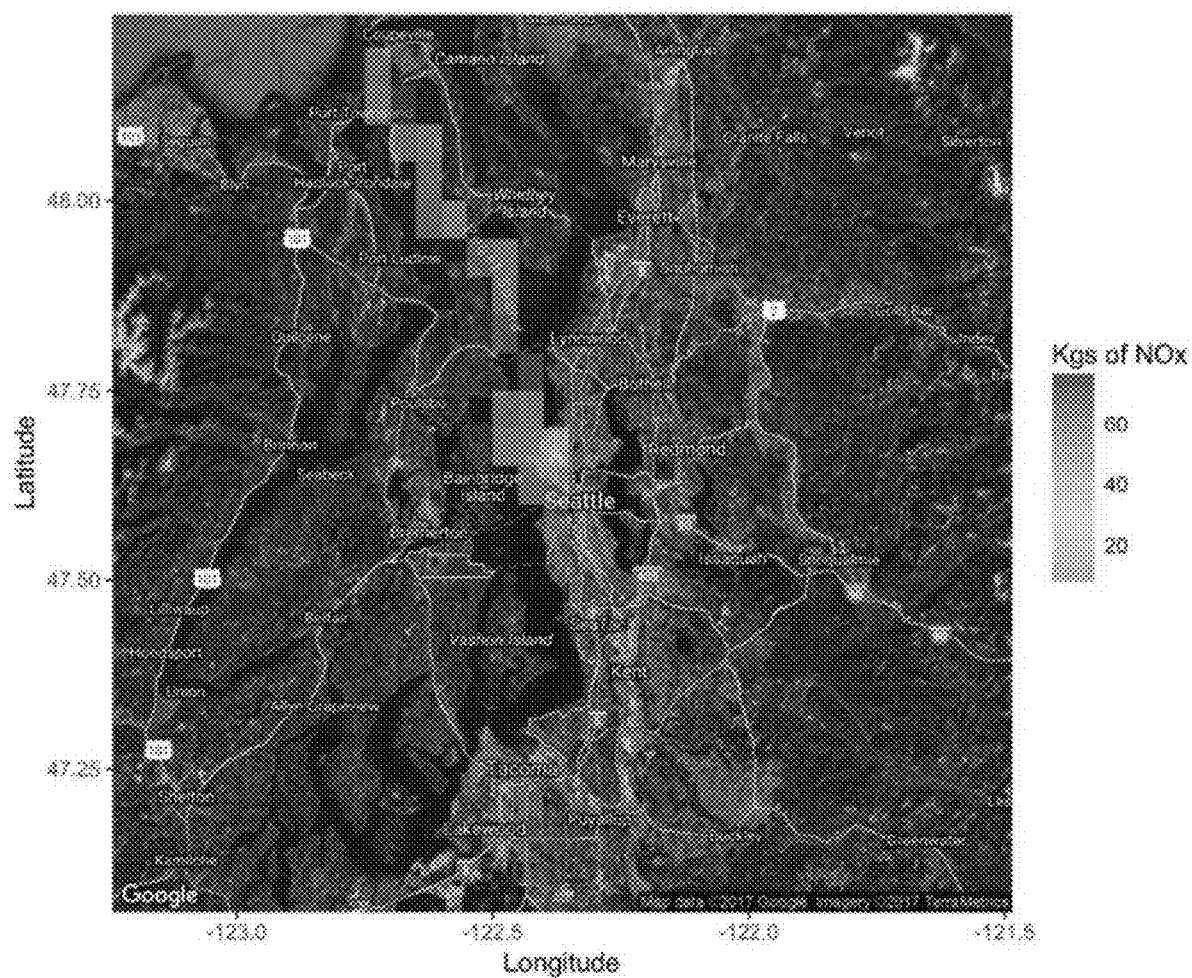
FIG. 8 shows individual vessel nitrogen oxides near a major city per six months.
Figure 9:
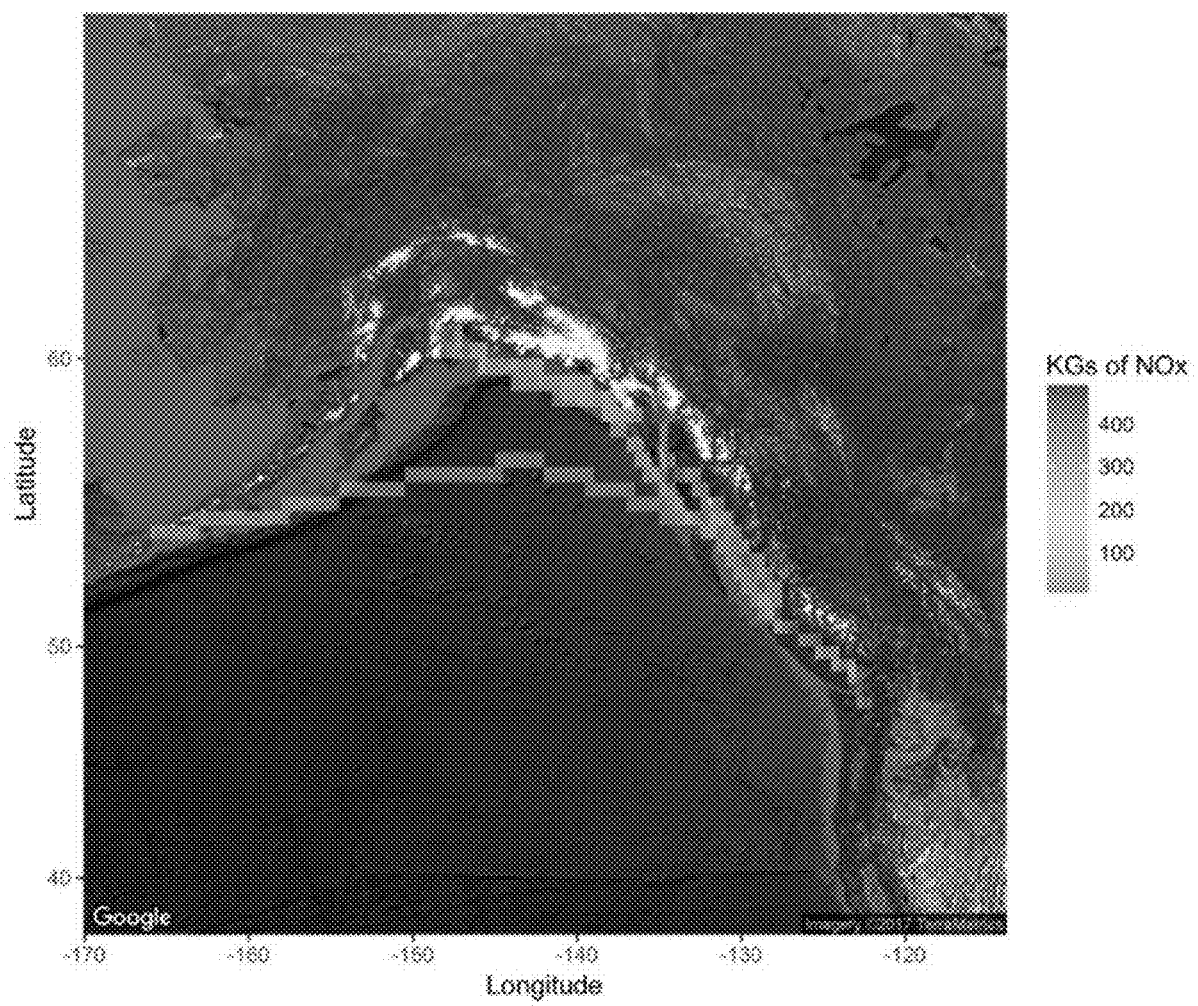
FIG. 9 shows fleet nitrogen oxides per six months.
Figure 10:
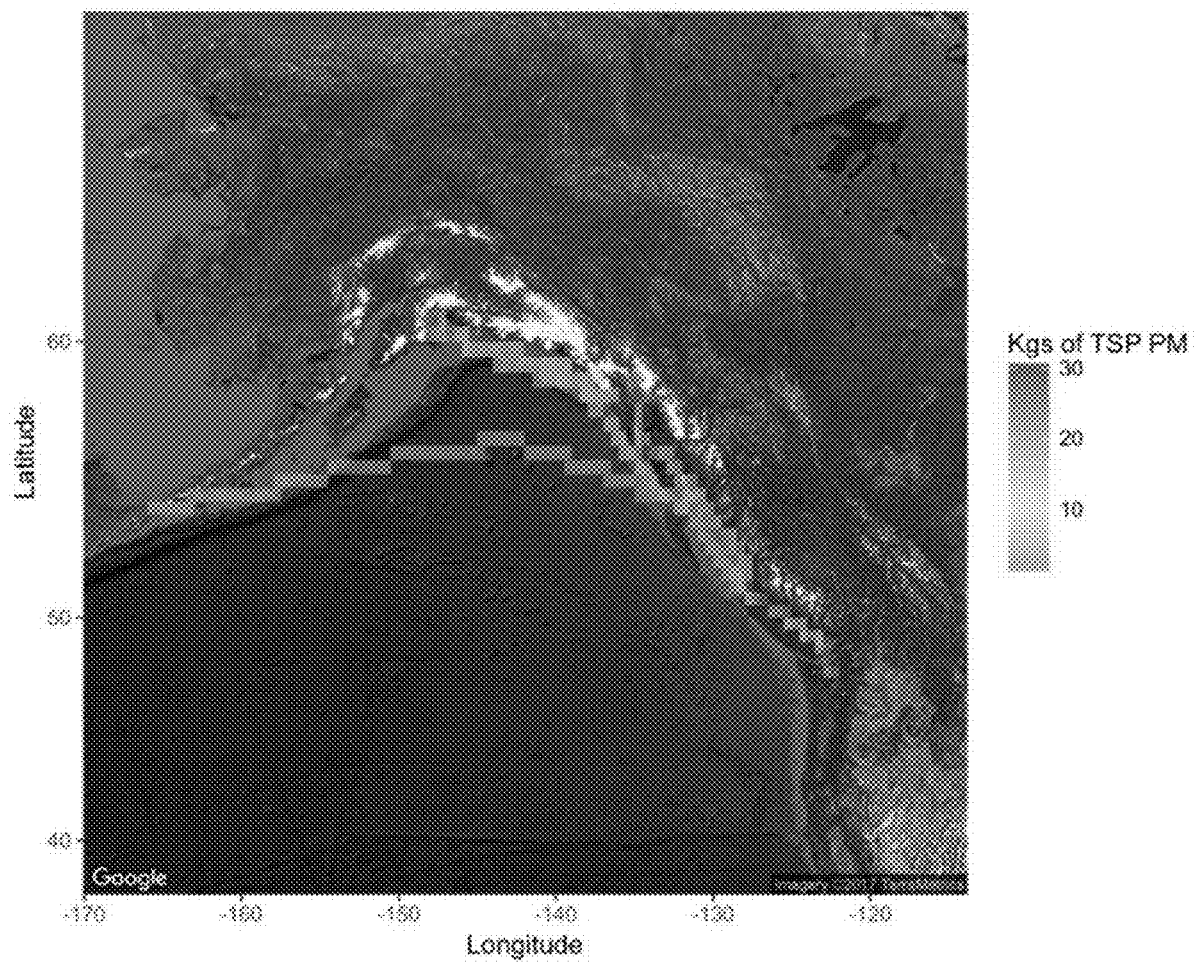
FIG. 10 shows fleet particulate matter per six months.

Since the constant in the equation (EF,i,j,m) are known explicitly for a given vessel and the variables (FC,p) can be predicted or measured using data from a locally-deployed sensing device, emissions estimates for a given vessel may be made. Additionally, with the use of GPS data, real-time, geo-spatially referenced emissions may be estimated. FIG. 6 shows fuel usage as measured and FIGS. 7 to 10 are examples of emissions estimates over a six-month period for various pollutants and across a range of vessels.

In some embodiments, the difference between predicted speed and measured speed is assumed to be constant for all possible vessel speeds at the analyzed point in space and time. Essentially, if the difference of speed is caused by external factors such as water speed and wind speed, then this difference will be applied equally across a range of variation in vessel parameters (e.g., engine RPM between 1000 and 2000, load between 50 and 100 percent, speed between 50 and 100 percent of a vessel's maximum speed, etc.). Typically, the speed difference won't be affected much by vessel parameters (e.g., RPM, load, speed), so the assumption holds. Some component(s) of the speed error can change with the hydrodynamics and aerodynamics of the vessel and towed load but for non-planing hulls (e.g., tugboats, fishing boats, etc.) those effects would typically cause minimal errors as the vessel's planing hydrodynamic and aerodynamic characteristics (for both planing and non-planing hulls) are already accounted for in the model and a standard load's hydrodynamics typically does not change substantially within practical towing speed limits.

Figure 11:
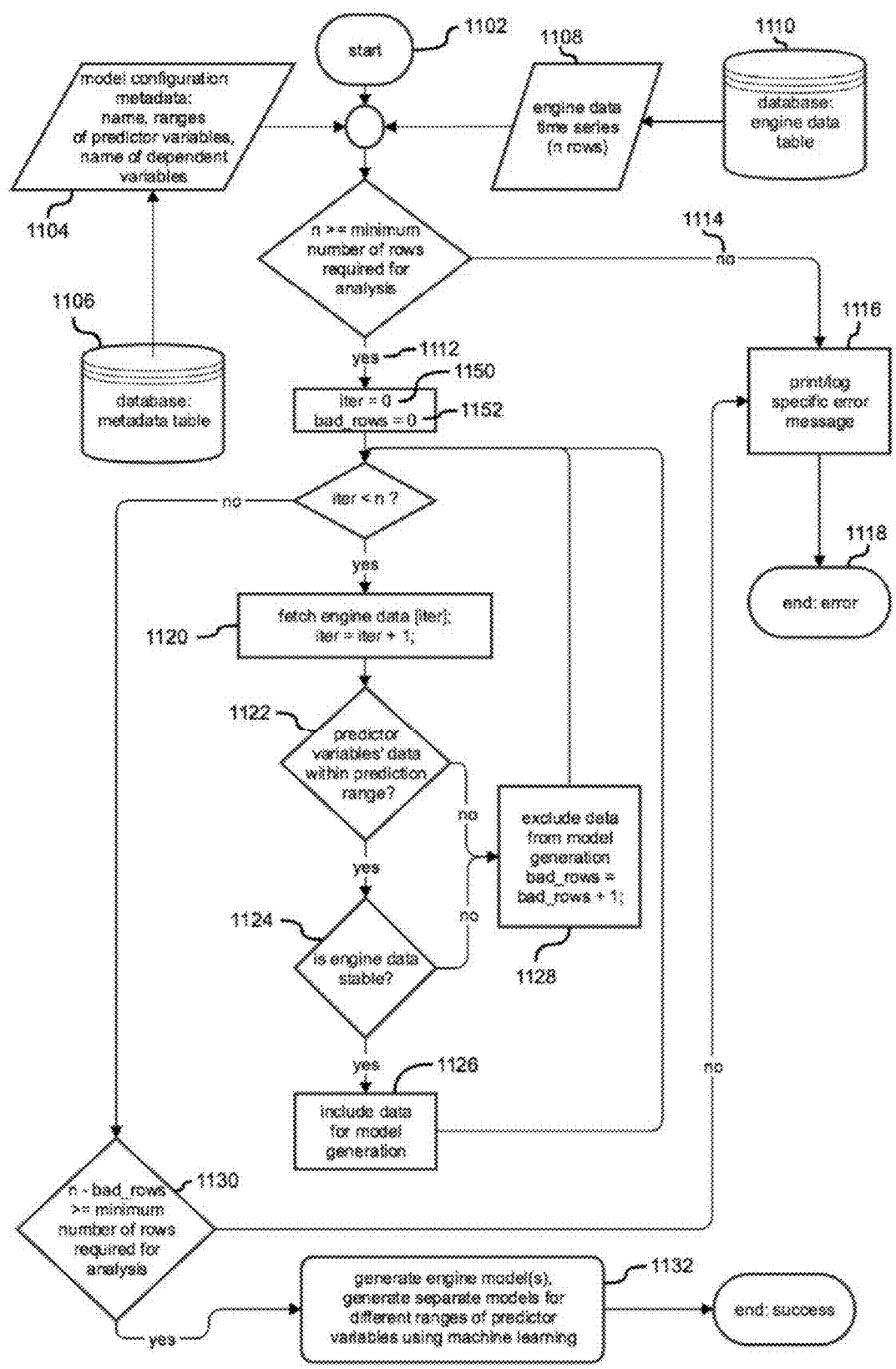
FIG. 11 shows a flow chart of data pre-processing for model generation in accordance with some embodiments of the presently disclosed technology.

As shown in FIG. 11, a flow chart of data pre-processing for model generation in accordance with some embodiments, the process starts 1102 by retrieving a metadata table from a database 1106. The model configuration metadata includes name, ranges of predictor variables, and names of independent variables. An engine data table is also received from a database 1110, which can be the same or separate from the metadata table database 1106. The engine data comprises a time series of, e.g., n rows 1108. The data is analyzed to determine whether n is greater or equal to a minimum number of rows required for analysis. Alternate or additional tests of starting data authenticity, validity, sufficiency, etc., may be applied. If yes 1112, iter is set to zero, and bad_rows is set to zero 1152. For each row, iter is incremented and engine data [iter] is fetched 1120. The data is tested to determine whether the predictor variables' data is within the prediction range 1122, and whether the engine data is stable 1124. If both are true, the data is included for model generation 1126, and iter is iterated. If either is not true, the data is excluded from model generation, and bad_rows is incremented 1128. After iterations are complete, if n−bad_rows is greater or equal to a minimum number of rows required for analysis, 1130, generate engine model(s), generate separate models for different ranges of predictor variables using machine learning 1132. If not or if n is less than the minimum number of rows required for analysis 1114, print/log specific error message 1116, and end 1118.

A first model will be generated as described above to predict speed over ground for a vehicle considering vessel or engine parameters. A second model referred to as a "trip model" will be created that predicts the optimal operating range for a vehicle. The trip model will incorporate trip distance, any trip configurations input by user (fuel cost, fixed costs, hourly costs, etc), any trip constraints provided by user (maximum cost, maximum emissions, maximum time, etc.) to generate output constraints. These output constraints will be used to recommend a range of optimal operating conditions to a user when the user's trip constraints (maximum cost, maximum emissions, maximum time, etc.) can be satisfied.

FIGS. 12a-12e show graphical user interfaces (GUIs) examples for prediction, planning, and optimization of trip time, cost, or fuel emissions, in accordance with some embodiments of the presently disclosed technology. A vessel operator can interact with the GUIs to plan and/or optimize vessel operation based on the trip model predictions. The particular optimization strategy described in FIGS. 12a-12e was developed for a shipping vessel that has a fixed rpm engine and alters its speed by changing propeller pitch. The model that was applied to optimize operations on the voyage in this example was implemented using a neural network machine learning model to predict vessel speed from fuel index as an indicator of engine load. The means of changing speed for this vessel is different from the fishing vessel described in FIG. 1 (where engine rpm is varied to modulate vessel speed) and therefore, whereas the inputs to predict speed in FIG. 1 were engine rpm and load, in this example fuel index (a measure of engine load) is used to predict speed.

Figure 12A:
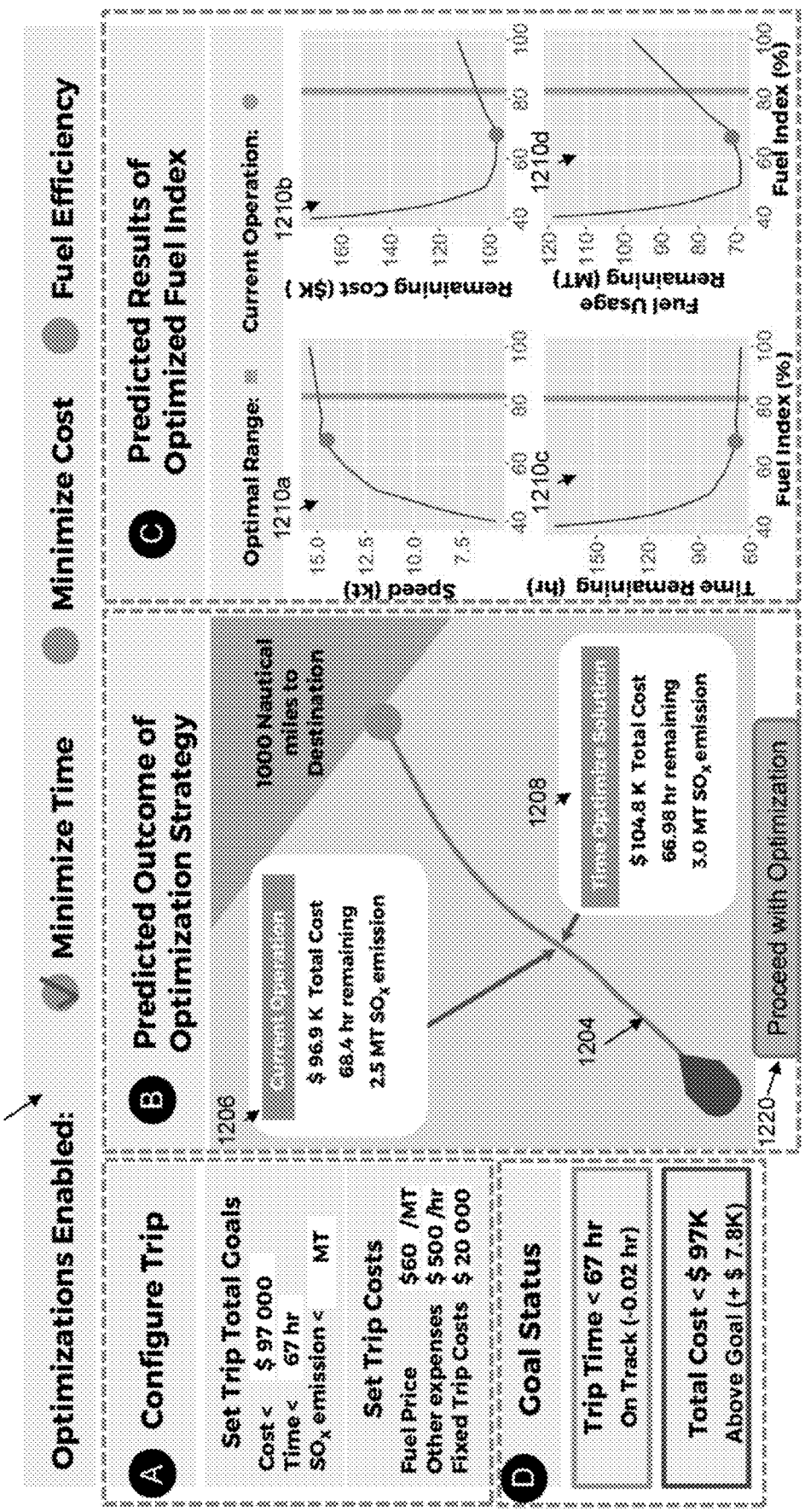
Figure 12B:
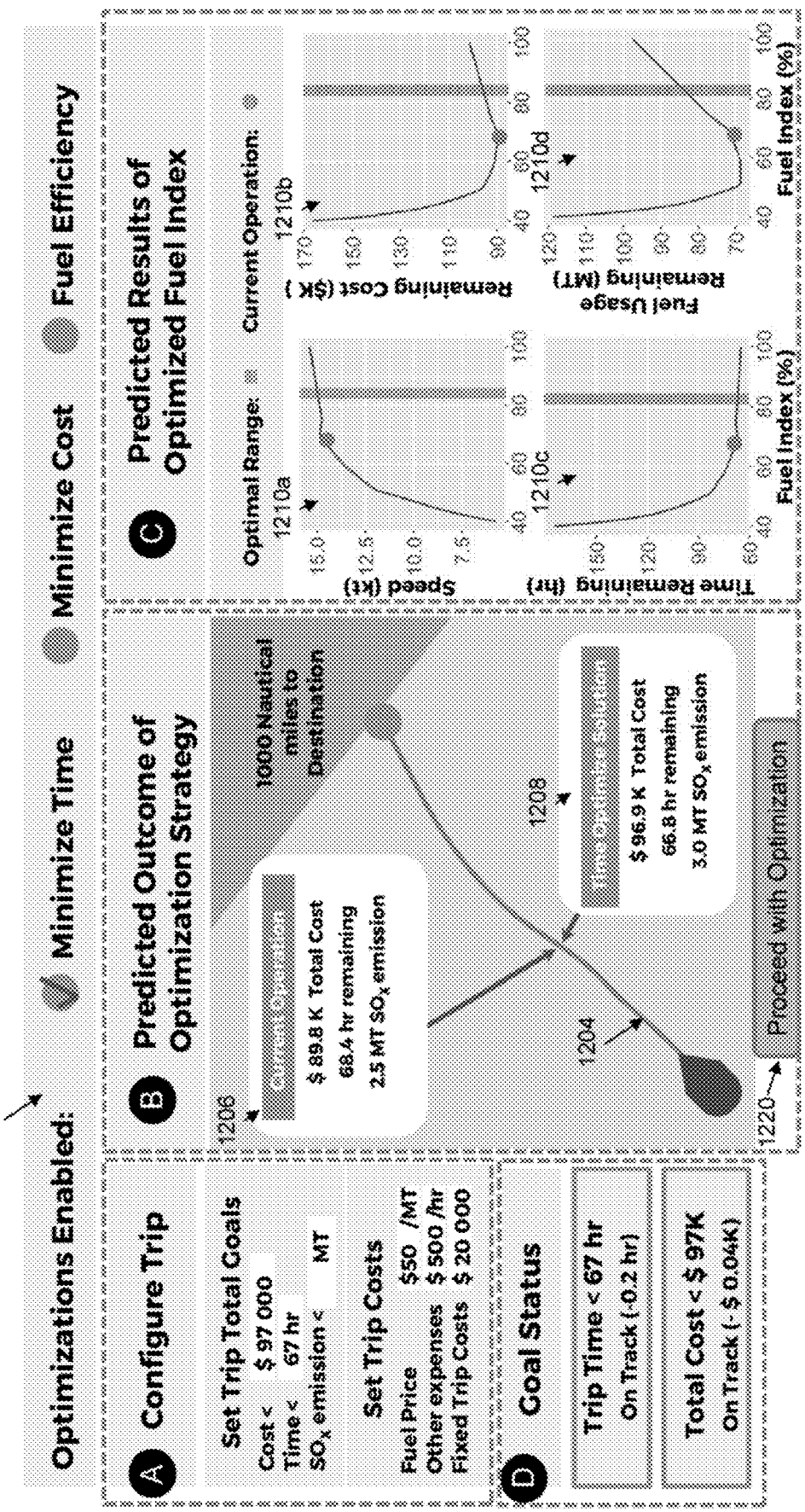
Figure 12D:
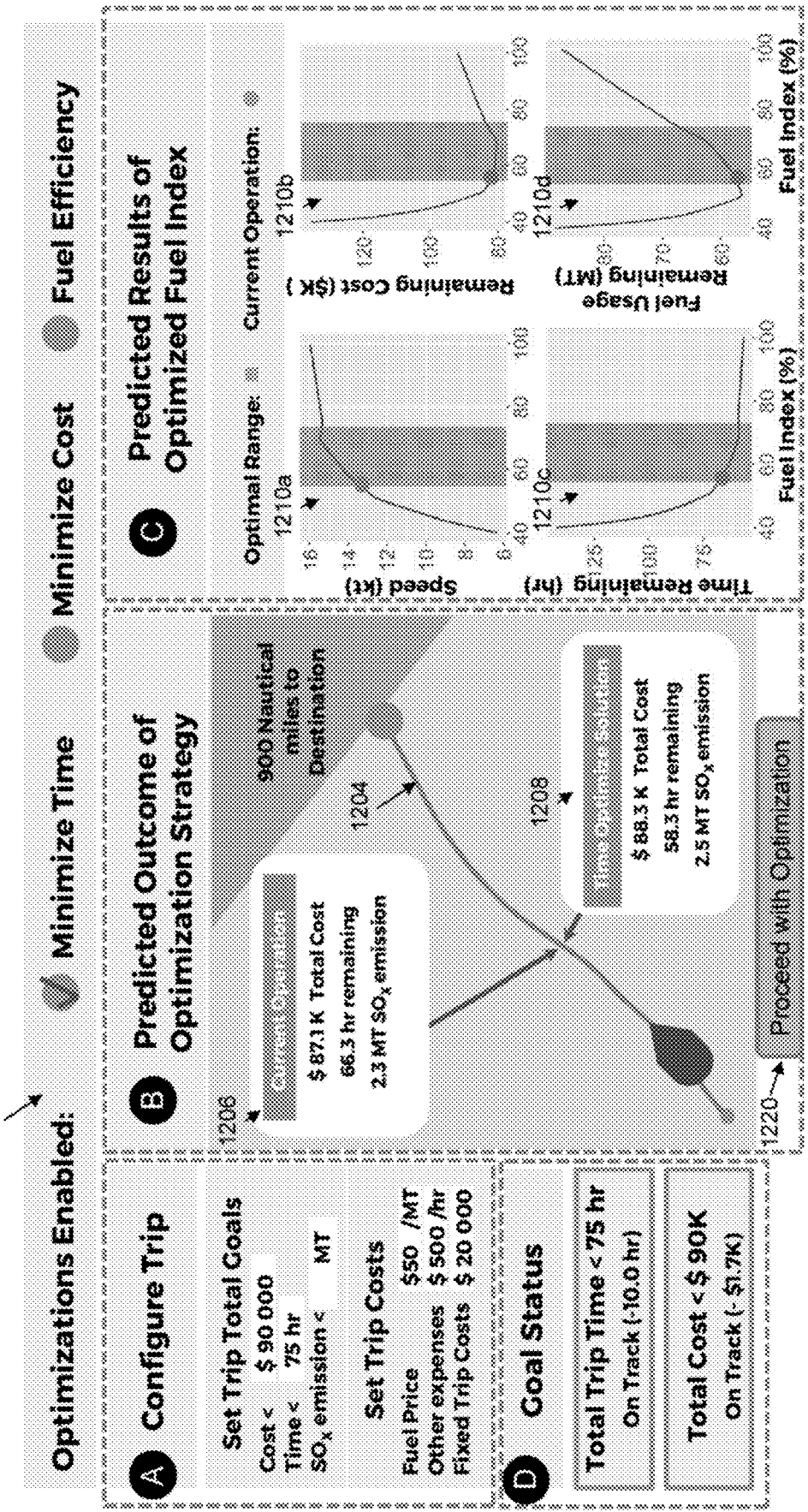
Figure 12E:
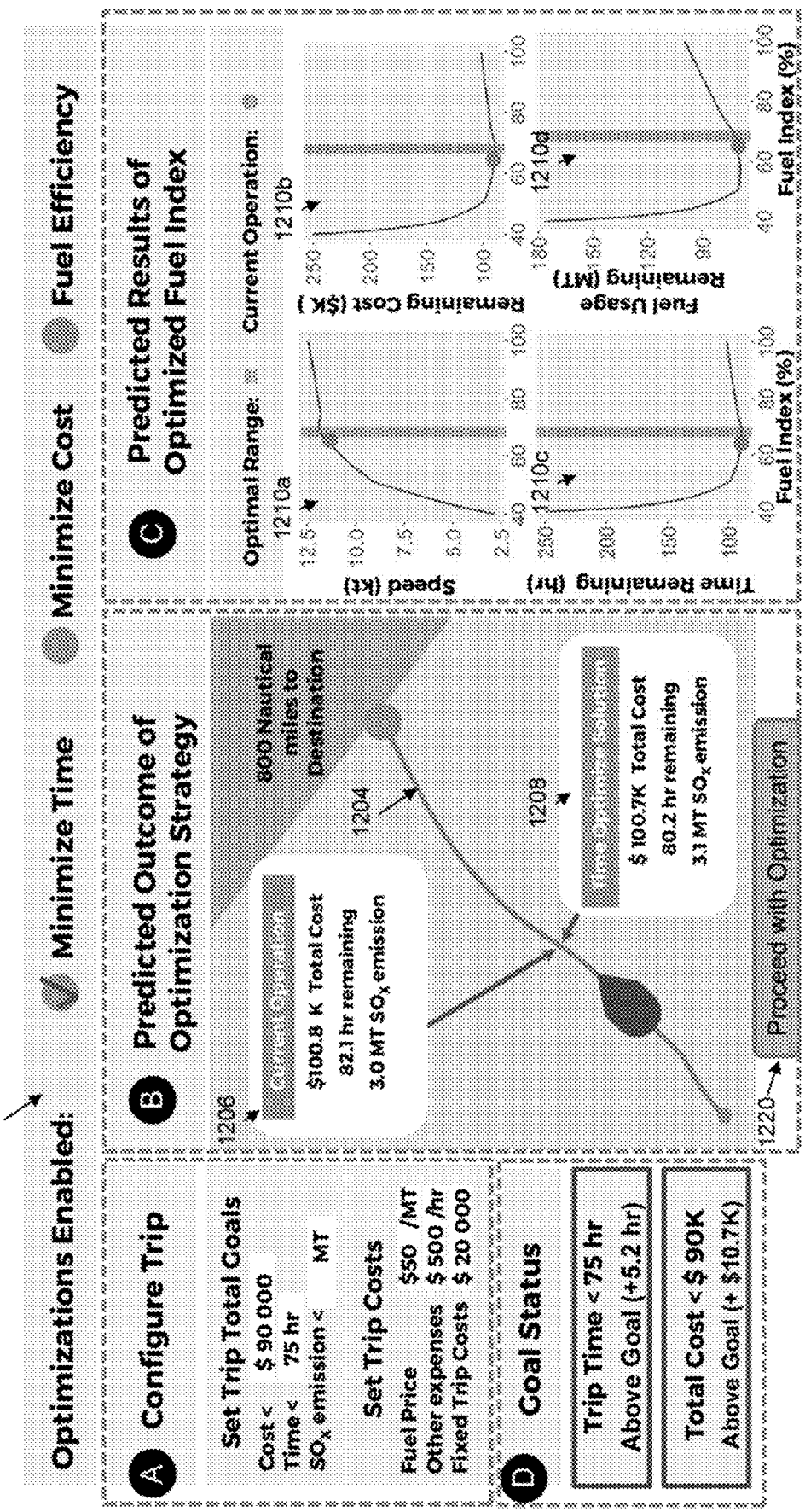

Here, FIGS. 12a-12c correspond to scenarios in the absence of a change in external factors that would affect vessel speed, while FIGS. 12d and 12e correspond to scenarios where external factors change and the model is updated to account for the resulting change in speed of the vessel.

With reference to FIGS. 12a, 12b, 12c1, and 12c2, before the vessel starts a trip, the vessel operator can select one or more options from an "Optimization Enabled" section 1202 of the GUI to optimize the trip. Here, the "Minimize Time" option is selected. Typically, this will result in the model to output a minimum time possible considering the constraints set by the operator for the trip's goals.

These constraints are set by the operator (some can be automatically populated based on available data) in section A ("Configure Trip"). Section B ("Prediction Outcome of Optimization Strategy") shows a graph including a previously charted route 1204 between the vessel's current location and the trip's destination, as well as pop-up information 1206 and 1208 comparing the vessel's current operation with the trip model-optimized solution. Section B also includes a "Proceed with Optimization" button 1220, which when clicked on (or otherwise actuated) causes the vessel to operate under the algorithm-optimized solution. Section C ("Predicted Results of Optimized Fuel Index") shows multiple charts 1210s to illustrate the mathematical relationship between engine load (as represented by "fuel index") and vessel speed, remaining cost, remaining time, and remaining fuel usage. In these charts, the vessel's current operation is compared with the optimal range computed using the trip model. Section D ("Goal Status") shows whether each goal set in section A can be satisfied based on the trip model prediction, with color-coded highlighting (e.g., green to indicate a goal can be met, and red to indicate a goal cannot be met).

As shown in FIG. 12a, the vessel is departing from a port where fuel is more expensive ($600 per metric ton). Because of the constraints set by the operator in section A, the GUI shows in section D that it is not possible to travel the 1000 nautical miles to the destination within all of the desired goals. This alerts the operator to either increase the time or budgeted cost to reach the destination. With reference to FIG. 12b, the cost of fuel is changed to $500 per metric ton (assuming that cheaper fuel has been acquired) and the operator can see (in section D) that in accordance with the trip model prediction, the vessel will reach the destination within the total time and total cost budget.

With reference to FIG. 12c1, the cost of fuel is also $500 per metric ton and the operator can see (in Section D) that in accordance with the trip model prediction, the vessel will reach the destination within a different set of time and cost constraints set in section A. Here, the operator actuates button 1220 to cause the vessel to implement the trip model-optimized solution. With reference to FIG. 12c2, the button 1220 is temporarily deactivated (e.g., grayed out) once actuated and the pop-up information 1206 for current operation is updated and highlighted to reflect the vessel's operation in accordance with the trip model-optimized solution. The button 1220 can become active when the trip model is updated.

In various embodiments, section A can include various ways (e.g., sliding bar, drop-down menu, or the like) that enable the operator to input and/or change trip goal(s) and/or trip cost(s). The other sections (e.g., section B, section C, and section D) can update their content in real-time or near real-time in accordance with computation using the trip model-based on change(s) made in section A.

FIGS. 12d and 12e show how the GUI updates its content as trip that began in accordance with FIGS. 12c1 and 12c2 progresses. As the vessel travels to track the trip model-predicted route 1204, it encounters environmental factors that can either add or subtract from the vessel's speed. The trip model can be constantly or periodically updated (e.g., retrained with at least some sensor data collected from a most recent period of time) to account for the environmental factors (e.g., to increase or decrease predicted vessel speed).

With reference to FIG. 12d, after the vessel has traveled 100 miles from the origin port, the neural network model determines that external factors contribute+0.6 knots to the predicted vessel speed. The trip model is updated accordingly and the GUI displays the effect on the predicted outcome of the trip for the remaining 900 nautical miles.

With reference to FIG. 12e, after the vessel has travelled another 100 nautical miles at the conditions illustrated in FIG. 12d, the neural network model determines that the external factors contribute −2.9 knots to predicted vessel speed. The trip model is further updated and the GUI displays the effect on the predicted outcome of the trip for the remaining 800 miles.

In some embodiments, the trip model is updated in real-time or near real-time to reflect a result based on sensor data or other relevant information as they are collected. The GUI content can be updated at the same or a slower rate as the trip is updated. In some embodiments, the trip model is only updated (and the GUI content correspondingly updated) when a predicted change (e.g., vessel speed) is above or below a predefined or automatically generated threshold. With the updates, the vessel operator can be properly alerted to unexpected situations and take further actions.

A computing device (e.g. an edge device, some embodiments of which described in U.S. application Ser. No. 15/703,487 filed Sep. 13, 2017) that implements various embodiments (or portions thereof) of the presently disclosed technology may be constructed as follows. A controller may include any or any combination of an a system-on-chip, or commercially available embedded processor, Arduino, MeOS, MicroPython, Raspberry Pi, or other type processor board. The device may also include an Application Specific Integrated Circuit (ASIC), an electronic circuit, a programmable combinatorial circuit (e.g., FPGA), a processor (shared, dedicated, or group) or memory (shared, dedicated, or group) that may execute one or more software or firmware programs, or other suitable components that provide the described functionality.

In embodiments, one or more of vehicle sensors to determine, sense, and/or provide to controller data regarding one or more other vehicle characteristics may be and/or include Internet of Things ("IoT") devices. IoT devices may be objects or "things", each of which may be embedded with hardware or software that may enable connectivity to a network, typically to provide information to a system, such as controller. Because the IoT devices are enabled to communicate over a network, the IoT devices may exchange event-based data with service providers or systems in order to enhance or complement the services that may be provided. These IoT devices are typically able to transmit data autonomously or with little to no user intervention. In embodiments, a connection may accommodate vehicle sensors as IoT devices and may include IoT-compatible connectivity, which may include any or all of WiFi, LoRan, 900 MHz Wifi, BlueTooth, low-energy BlueTooth, USB, UWB, etc. Wired connections, such as Ethernet 1000baseT, CAN-Bus, USB 3.0, USB 3.1, etc., may be employed.

Embodiments may be implemented into a system using any suitable hardware and/or software to configure as desired. The computing device may house a board such as motherboard which may include a number of components, including but not limited to a processor and at least one communication interface device. The processor may include one or more processor cores physically and electrically coupled to the motherboard. The at least one communication interface device may also be physically and electrically coupled to the motherboard. In further implementations, the communication interface device may be part of the processor. In embodiments, processor may include a hardware accelerator (e.g., FPGA).

Depending on its applications, computing device may include other components which include, but are not limited to, volatile memory (e.g., DRAM), non-volatile memory (e.g., ROM), and flash memory. In embodiments, flash and/or ROM may include executable programming instructions configured to implement the algorithms, operating system, applications, user interface, etc.

In embodiments, computing device may further include an analog-to-digital converter, a digital-to-analog converter, a programmable gain amplifier, a sample-and-hold amplifier, a data acquisition subsystem, a pulse width modulator input, a pulse width modulator output, a graphics processor, a digital signal processor, a crypto processor, a chipset, a cellular radio, an antenna, a display, a touchscreen display, a touchscreen controller, a battery, an audio codec, a video codec, a power amplifier, a global positioning system (GPS) device or subsystem, a compass (magnetometer), an accelerometer, a barometer (manometer), a gyroscope, a speaker, a camera, a mass storage device (such as a SIM card interface, and SD memory or micro-SD memory interface, SATA interface, hard disk drive, compact disk (CD), digital versatile disk (DVD), and so forth), a microphone, a filter, an oscillator, a pressure sensor, and/or an RFID chip.

The communication network interface device may enable wireless communications for the transfer of data to and from the computing device. The term "wireless" and its derivatives may be used to describe circuits, devices, systems, processes, techniques, communications channels, etc., that may communicate data through the use of modulated electromagnetic radiation through a non-solid medium. The term does not imply that the associated devices do not contain any wires, although in some embodiments they might not. The communication chip 406 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible BWA networks are generally referred to as WiMAX networks, an acronym that stands for Worldwide Interoperability for Microwave Access, which is a certification mark for products that pass conformity and interoperability tests for the IEEE 802.16 standards. The communication chip 406 may operate in accordance with a Global System for Mobile Communication (GSM), General Packet Radio Service (GPRS), Universal Mobile Telecommunications System (UMTS), High Speed Packet Access (HSPA), Evolved HSPA (E-HSPA), or LTE network. The communication chip 406 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 406 may operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication chip may operate in accordance with other wireless protocols in other embodiments. The computing device may include a plurality of communication chips. For instance, a first communication chip may be dedicated to shorter range wireless communications such as Wi-Fi and Bluetooth and a second communication chip may be dedicated to longer range wireless communications such as GPS, EDGE, GPRS, CDMA, WiMAX, LTE, Ev-DO, and others.

The processor of the computing device may include a die in a package assembly. The term "processor" may refer to any device or portion of a device that processes electronic data from registers and/or memory to transform that electronic data into other electronic data that may be stored in registers and/or memory.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. The various embodiments and optional features recited herein may be employed in any combination, sub-combination, or permutation, consistent with the discussions herein. This application is intended to cover any adaptations or variations of the embodiments discussed herein, limited only by the claims.

In accordance with some embodiments, the presently disclosed technology implements one or more algorithms selected from the following:

Algorithm 1: Create a statistical model of speed vs. RPM and load, create a statistical model for fuel flow vs RPM and load using machine learning Data: engine data time series containing time-stamp, engine RPM, load, and fuel flow from the engine's Electronic Control Module, speed, latitude, and longitude time series data from a GPS unit, which are time synchronized for the training period.

Result: engine's average RPM, average load, total fuel flow, vessel speed model using machine learning initialization;

step 1: create minutes average data from data that is sampled every second;

step 2: create average engine RPM from multiple engine RPMs, average engine load from multiple engine loads, average engine fuel flow rate from multiple engine fuel flow rates;

step 3: define a predictable range for RPM (e.g., RPM greater than idle range);

step 4: create a new Boolean column called isStable that can store true/false for predictors' combined stability;

step 5: compute isStable and store the values as a part of the time series (e.g., isStable=true if within last n minutes, the change in predictor variables (RPM, load) are within k standard deviation, else isStable=false);

if predictor variables are within predictable range and isStable=true for some predetermined time then if all the engines are in forward propulsion mode and RPMs are almost equal (e.g., all engine RPMs are within 5% of mean RPM) then step 6: include the record for model creation;

else step 7: exclude the record from model creation;

end else step 8: exclude the record from model creation;

end step 9: create a statistical model of speed vs. RPM and load using machine learning;

step 10: create a statistical model of fuel flow vs. RPM and load using machine learning;

step 11: test different model building methods in order to reduce or eliminate model bias (e.g., splines, support vector machines, neural networks);

step 12: choose the best fit model for the training data;

step 13: combine the two models to create one model that has engine's average RPM, average load, total fuel flow, and vessel speed;

Algorithm 2: Convert statistical model to a look-up table

Data: Statistical model from Algorithm 1 Result: Model look-up table initialization;

if model creation is successful then create the model look-up table with n+m columns considering the model represents $f$: Rn 1→Rm;

e.g., a lookup table for engine RPM 0-2000 and load 0-100 will have 200,000+1 rows assuming an interval of 1 for each independent variable. The model will have 2+2=4 columns assuming independent variables of engine RPM and load and dependent variables of fuel flow and vessel speed. For each engine RPM and load, the statistical model is used to predict the values of the dependent parameters and those predicted values are then stored in the look-up table;

e.g., a lookup table for a bounded region may be between engine RPM 1000-2000 and load 40-100 will have 60,000+1 rows assuming an interval of 1 for each independent variable;

else

No operation end

Algorithm 3: Create error statistics for the engine parameter of interest during training period Data: Statistical model and training data Result: error statistics initialization;

if model creation is successful then use the model from Algorithm 1 or look-up table from Algorithm 2 to predict the time series of interest;

calculate the difference between actual value and predicted value;

create error time series;

else

Error Message;

end calculate error mean and error standard deviation;

Algorithm 4: Filter engine RPM values to a range satisfying the given constraints Data: updated model that reflects current conditions, constraints, e.g., current load, speed range, trip time limit, trip fuel cost limit, emissions limit, etc.

Result: optimum range of RPMs and trip time and trip cost for each RPM initialization;

at run time:

step 1: Apply the constraints and filter RPM ranges that satisfies the constraints;

step 2: output filtered RPM and associated fuel flow and speed data;

Algorithm 5: System algorithm

Data: engine data training and near real-time test data, k (the standardized error threshold), trip distance, trip time constraint if applicable Result: updated model that reflects current conditions initialization;
  at design time:
    step 1: Use Algorithm 1 to create engine speed vs. RPM and load model and fuel flow vs. RPM and load from training data;
    step 2: Use Algorithm 3 to create error statistics;
    step 3: optionally, use Algorithm 2 to create model look-up table;
    step 4: deploy the model on edge device and/or cloud database; at runtime:
    while engine data is available and predictors are within range and engine is in steady state do
      if model deployment is successful then
        step 5: compute and save z error score(s) of current speed data using Algorithm 3;
        if z score is greater than k then
          step 6: Re-generate new speed vs RPM model assuming the error is constant;
          step 7: Calculate the trip time vs RPM model using the new speed/RPM model from step 6;
        else
          step 7: Calculate trip time vs RPM model using the previous training speed/RPM model;
        end
        step 8: compute and save z error score(s) of current fuel flow data using Algorithm 3;
        if z score is greater than k then
          step 9: Re-generate the fuel flow rate vs. RPM curve;
          step 10: Re-generate the trip fuel usage vs. RPM model using the predicted trip time from step 7 above
        else
          step 10: Calculate the trip fuel usage vs RPM model using the previous training fuel-flow/RPM model;
        end
        step 11: Use Algorithm 4 to calculate optimal engine RPM and associated trip time and trip cost information;
      else end
      step10: nop;
    end The various embodiments described above can be combined to provide further embodiments. All of the U.S. patents, U.S. patent application publications, U.S. patent applications, foreign patents, foreign patent applications and non-patent publications referred to in the present application and/or listed in the Application Data Sheet are incorporated herein by reference, in their entirety. Aspects of the embodiments can be modified, if necessary to employ concepts of the various patents, applications and publications to provide yet further embodiments. In cases where any document incorporated by reference conflicts with the present application, the present application controls.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for producing a real-time output based on at least one constraint and a relationship among vehicle speed, at least one engine or vessel parameter that indicates or influences propulsion, and at least one of directly measured operating condition or indirectly measured operating condition, comprising:
    monitoring vehicle speed and fuel consumption rate of a vehicle over an engine speed range of at least one engine of the vehicle;
    generating a predictive model relating the vehicle's engine speed, vehicle speed, and fuel consumption rate, based on the monitoring;
    receiving at least one constraint on at least one of a trip time, trip fuel consumption, vehicle speed, fuel consumption rate, and estimated emissions;
    automatically producing by at least one automated processor, based on the predictive model, and the received at least one constraint, an output constraint; and
    determining a failure of the predictive model.

2. The method according to claim 1, wherein the at least one engine or vessel parameter includes at least one of engine load, engine speed, fuel consumption rate, propeller pitch, trim, waterline, rudder angle, or rack position.

3. The method according to claim 1, further comprising monitoring at least one the vehicle's engine speed, engine load, er-propeller pitch, or cargo weight during the monitoring.

4. The method according to claim 1, further comprising monitoring at least one of wind speed or water current speed along an axis of motion of the vehicle during the monitoring.

5. The method according to claim 1, further comprising regenerating the predictive model based on newly-acquired data.

6. The method according to claim 1, further comprising annotating monitored vehicle speed and fuel consumption rate of the vehicle based on vehicle operating conditions.

7. The method according to claim 1, wherein the output constraint comprises a real-time output comprising a constraint on vehicle operation.

8. The method according to claim 1, where the output constraint comprises at least one of an engine speed constraint, a propeller pitch constraint, a combination of engine speed and propeller pitch, or a combination of monitored inputs.

9. A method for producing a real-time output based on at least one constraint and a relationship among vehicle speed, at least one engine or vessel parameter that indicates or influences propulsion, and at least one of directly measured operating condition or indirectly measured operating condition, comprising:
    monitoring vehicle speed and fuel consumption rate of a vehicle over an engine speed range of at least one engine of the vehicle;
    generating a predictive model relating the vehicle's engine speed, vehicle speed, and fuel consumption rate, based on the monitoring;
    receiving at least one constraint on at least one of a trip time, trip fuel consumption, vehicle speed, fuel consumption rate, and estimated emissions;
    automatically producing by at least one automated processor, based on the predictive model, and the received at least one constraint, an output constraint; and
    performing at least one of:
        monitoring at least one of wind speed or water current speed along an axis of motion of the vehicle during the monitoring, or
        generating the predictive model further based on at least one of forecast wind condition or forecast water condition.

10. The method according to claim 9, further comprising determining a failure of the predictive model.

11. The method according to claim 9, further comprising adaptively updating the predictive model.

12. The method according to claim 9, further comprising determining an error between predicted vessel speed and measured vessel speed in a direction of the vehicle's motion and incorporating the error into modeling to compute one or more output constraints.

13. The method according to claim 9, further comprising tagging data representing the vehicle's engine speed, vehicle speed, and fuel consumption rate with context information.

14. The method according to claim 9, wherein the received constraint comprises at least one of a trip time, a trip fuel consumption, a vehicle speed, a fuel consumption rate, an estimate of pollutant emissions, a cost optimization, an economic optimization of at least fuel cost and time cost.

15. A control system for a vehicle, comprising:
  a first input configured to receive information for monitoring at least a vehicle speed and a fuel consumption rate of the vehicle over an engine speed range of at least one engine of the vehicle;
  a second input configured to receive at least one constraint on at least one of a trip time, trip fuel consumption, vehicle speed, fuel consumption rate, and estimated pollutant emissions;
  a predictive model relating the vehicle's engine speed, vehicle speed, and fuel consumption rate, generated based on the monitoring; and
  at least one automated processor configured to fa) automatically produce, based on the predictive model, and the received at least one constraint, an output constraint, and (b) determine a failure of the predictive model.

16. The control system according to claim 15, further comprising an output, configured to control an engine of the vehicle according to the output constraint.

17. The control system according to claim 15, wherein the at least one automated processor is further configured to generate the predictive model.

18. The control system according to claim 15, wherein the at least one automated processor is further configured to adaptively update the predictive model.

19. The control system according to claim 15, wherein the at least one automated processor is further configured to determine an error between predicted fuel flow rate and actual fuel flow rate.

20. The control system according to claim 15, wherein the at least one automated processor is further configured to filter data representing the vehicle's engine speed, vehicle speed, and fuel consumption rate for anomalies before the predictive model is generated.

21. The control system according to claim 15, wherein the predictive model is formulated using data representing the vehicle's engine speed, vehicle speed, and fuel consumption rate tagged with context information.

22. A control system for a vehicle, comprising:
  a first input configured to receive information for monitoring at least a vehicle speed and a fuel consumption rate of the vehicle over an engine speed range of at least one engine of the vehicle;
  a second input configured to receive at least one constraint on at least one of a trip time, trip fuel consumption, vehicle speed, fuel consumption rate, and estimated pollutant emissions;
  a predictive model relating the vehicle's engine speed, vehicle speed, and fuel consumption rate, generated based on the monitoring; and
  at least one automated processor configured to automatically produce, based on the predictive model, and the received at least one constraint, an output constraint, wherein the output constraint is adaptive with respect to at least one of a wind condition or water condition.

23. The control system according to claim 22, wherein the at least one automated processor is further configured to determine a failure of the predictive model.

24. The control system according to claim 22, wherein the at least one automated processor is further configured to regenerate the predictive model based on newly-acquired data.

25. The control system according to claim 22, wherein the at least one automated processor is further configured to annotate monitored vehicle speed and fuel consumption rate of the vehicle based on vehicle operating conditions.

26. The control system according to claim 22, wherein the predictive model comprises at least one of a generalized additive model, a neural network, or a support vector machine.

27. The control system according to claim 22, wherein the predictive model models a fuel consumption with respect to engine speed.

28. The control system according to claim 2, wherein the vehicle comprises at least one of a marine vessel, a railroad locomotive, an automobile, an aircraft, or an unmanned aerial vehicle.

* * * * *

UNITED STATES PATENT AND TRADEMARK OFFICE
CERTIFICATE OF CORRECTION

PATENT NO. : 10,803,213 B2
APPLICATION NO. : 16/678991
DATED : October 13, 2020
INVENTOR(S) : Bhaskar Bhattacharyya et al.

It is certified that error appears in the above-identified patent and that said Letters Patent is hereby corrected as shown below:

In the Claims

Column 26, Claim 3, Line 20:
"load, er-propeller pitch," should be: --load, propeller pitch,--.

Column 27, Claim 15, Line 26:
"configured to fa) automatically" should be: --configured to (a) automatically--.

Column 28, Claim 28, Line 42:
"according to claim 2, wherein" should be: --according to claim 22, wherein--.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*